US009672985B2

(12) United States Patent
Mori et al.

(10) Patent No.: US 9,672,985 B2
(45) Date of Patent: *Jun. 6, 2017

(54) CAPACITOR AND METHOD FOR MANUFACTURING THE SAME

(71) Applicant: NIPPON CHEMI-CON CORPORATION, Tokyo (JP)

(72) Inventors: Masayuki Mori, Tokyo (JP); Tatsuo Kubouchi, Tokyo (JP); Akihiro Furusawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 212 days.

This patent is subject to a terminal disclaimer.

(21) Appl. No.: 13/890,426

(22) Filed: May 9, 2013

(65) Prior Publication Data

US 2013/0250475 A1    Sep. 26, 2013

Related U.S. Application Data

(63) Continuation of application No. PCT/JP2011/006266, filed on Nov. 9, 2011.

(30) Foreign Application Priority Data

Nov. 9, 2010 (JP) .................................. 2010-251352
Nov. 9, 2010 (JP) .................................. 2010-251355

(Continued)

(51) Int. Cl.
*H01G 9/155* (2006.01)
*H01G 4/01* (2006.01)
(Continued)

(52) U.S. Cl.
CPC ................. *H01G 4/01* (2013.01); *H01G 4/32* (2013.01); *H01G 9/008* (2013.01); *H01G 9/04* (2013.01);
(Continued)

(58) Field of Classification Search
CPC ......... H01G 11/16; H01G 11/70; H01G 11/72
(Continued)

(56) References Cited

U.S. PATENT DOCUMENTS 5,253,795 A   10/1993   Sato
6,222,720 B1   4/2001   Aoki et al.
(Continued)

FOREIGN PATENT DOCUMENTS

CN   1701402 A    11/2005
DE   10041369 A1   8/2001
(Continued)

OTHER PUBLICATIONS

Notification of Transmittal of Translation of the International Preliminary Report on PAtentability (Forms PCT/IB/338) of International Application No. PCT/JP2011/006266 mailed May 23, 2013 with Forms PCT/IB/373 and PCT/IB/237.

(Continued)

*Primary Examiner* — Eric Thomas
(74) *Attorney, Agent, or Firm* — Westerman, Hattori, Daniels & Adrian, LLP

(57) ABSTRACT

A capacitor includes a capacitor element that is a wound element or an element other than the wound element, and that includes electrode bodies each of which is in an anode side and a cathode side, and separators that intervenes between the electrode bodies; a sealing member that seals an opening of a case member accommodating the capacitor element; at least one electrode protrusion that protrudes from one of the electrode bodies on an element end-face of the capacitor element, at least one of current collector plate that is connected to the electric protrusion; and at least one terminal member that is disposed in the sealing member, and (Continued)

is superposed on the current collector plate, a side face part of the terminal member being welded to a side face part of the current collector plate.

19 Claims, 23 Drawing Sheets

(30) Foreign Application Priority Data

| | | |
|---|---|---|
| Nov. 9, 2010 | (JP) | 2010-251356 |
| Feb. 22, 2011 | (JP) | 2011-035484 |
| Jul. 21, 2011 | (JP) | 2011-160247 |
| Jul. 21, 2011 | (JP) | 2011-160248 |

(51) Int. Cl.
   *H01G 4/32* (2006.01)
   *H01G 9/008* (2006.01)
   *H01G 9/04* (2006.01)
   *H01G 13/00* (2013.01)

(52) U.S. Cl.
   CPC ............. *H01G 13/00* (2013.01); *Y02E 60/13* (2013.01); *Y10T 29/435* (2015.01)

(58) Field of Classification Search
   USPC ........................................ 361/502; 29/25.03
   See application file for complete search history.

(56) References Cited

U.S. PATENT DOCUMENTS

| | | | |
|---|---|---|---|
| 6,411,496 B1* | 6/2002 | Suhara et al. | 361/502 |
| 6,456,484 B1 | 9/2002 | Matsuoka et al. | |
| 9,053,858 B2 | 6/2015 | Mori et al. | |
| 2002/0195432 A1 | 12/2002 | Sekiguchi | |
| 2004/0023107 A1 | 2/2004 | Nakanishi et al. | |
| 2005/0042508 A1 | 2/2005 | Kim et al. | |
| 2006/0034036 A1 | 2/2006 | Miura et al. | |
| 2006/0187615 A1* | 8/2006 | Hozumi et al. | 361/502 |
| 2009/0109600 A1 | 4/2009 | Reddy et al. | |
| 2010/0155378 A1 | 6/2010 | Fuchs et al. | |
| 2011/0020666 A1 | 1/2011 | Wakisaka et al. | |
| 2011/0244317 A1 | 10/2011 | Lee et al. | |
| 2011/0256433 A1 | 10/2011 | Fuhr et al. | |
| 2012/0055909 A1 | 3/2012 | Miyake et al. | |
| 2013/0250475 A1 | 9/2013 | Mori et al. | |

FOREIGN PATENT DOCUMENTS

| | | |
|---|---|---|
| DE | 112004000061 T5 | 9/2005 |
| DE | 69834706 T2 | 6/2007 |
| EP | 0924723 A2 | 6/1999 |
| EP | 2355208 A2 | 8/2011 |
| JP | 05-47367 A | 2/1993 |
| JP | 06-275476 A | 9/1994 |
| JP | 08-022818 A | 1/1996 |
| JP | 10-83833 A | 3/1998 |
| JP | 11-219857 A | 8/1999 |
| JP | 11-251190 A | 9/1999 |
| JP | 2000-294222 A | 10/2000 |
| JP | 2001-68379 A | 3/2001 |
| JP | 2001-102031 A | 4/2001 |
| JP | 2002-164259 A | 6/2002 |
| JP | 2003-001452 A | 1/2003 |
| JP | 2003-263977 A | 9/2003 |
| JP | 2004-071267 A | 3/2004 |
| JP | 2006-4729 A | 1/2006 |
| JP | 2007-066599 A | 3/2007 |
| JP | 2007-326140 A | 12/2007 |
| JP | 2007-335156 A | 12/2007 |
| JP | 2008-192321 A | 8/2008 |
| JP | 2009-188095 A | 8/2009 |
| JP | 2010-10166 A | 1/2010 |
| JP | 2010-010166 A | 1/2010 |
| JP | 2010-093178 A | 4/2010 |
| JP | 2010-114240 A | 5/2010 |
| JP | 2010-135651 A | 6/2010 |
| JP | 2012-043957 A | 3/2012 |
| JP | 2012-104617 A | 5/2012 |
| JP | 2012-104618 A | 5/2012 |
| JP | 2012-104619 A | 5/2012 |
| JP | 2012-104620 A | 5/2012 |
| JP | 2012-104621 A | 5/2012 |
| JP | 2012-104622 A | 5/2012 |
| JP | 2012-104623 A | 5/2012 |
| JP | 2012-174886 A | 9/2012 |
| JP | 2013-12646 A | 1/2013 |
| JP | 2013-26462 A | 2/2013 |
| JP | 2013-26463 A | 2/2013 |
| KR | 10-2005-0113592 A | 12/2005 |
| WO | 2004/084246 A1 | 9/2004 |
| WO | 2010/041461 A1 | 4/2010 |
| WO | 2010/059957 A2 | 5/2010 |
| WO | 2010/101367 A2 | 8/2010 |
| WO | 2010/131298 A1 | 11/2010 |
| WO | 2012/023289 A1 | 2/2012 |
| WO | 2012/063486 A1 | 5/2012 |

OTHER PUBLICATIONS

Office Action dated Apr. 1, 2015, issued in corresponding Chinese Patent Application No. 201180053897.9, with English translation (17 pages).
International Search Report for PCT/JP2011/006266, Mailing Date of Jan. 24, 2012.
Written Opinion for PCT/2011/006266, Mailing Date of Jan. 24, 2012.
Japanese Office Action dated Sep. 2, 2014, issued in corresponding JP application No. 2010-251352 with English translation (8 pages).
Chinese Office Action dated Feb. 9, 2015, issued in corresponding CN Patent Application No. 201180039963.7 with English translation (19 pages).
Japanese Office Action dated Dec. 2, 2014, issued in corresponding JP Patent Application No. 2010-251355 with English translation (4 pages).
Japanese Office Action dated Dec. 2, 2014, issued in corresponding JP Patent Application No. 2010-251356 with English translation (5 pages).
Office action Dated Aug. 4, 2015, issued in counterpart Japanese application No. 2010-251355, with English abstract (6 pages).
Office action Dated Aug. 4, 2015, issued in counterpart Japanese application No. 2010-251356, with English abstract (7 pages).
Office action Dated Aug. 4, 2015, issued in counterpart Japanese application No. 2010-251358, with English abstract (5 pages).
Office Action dated Dec. 8, 2015, issued in counterpart Japanese Patent Application No. 2010-251355, with English translation (5 pages).
Office Action dated Dec. 4, 2015, issued in counterpart Chinese Patent Application No. 201180053897.9, with English translation (16 pages).
Office Action dated Dec. 8, 2015, issued in coutnerpart Chinese Patent Application No. 201180039963.7, with English translation (17 pages).
Office Action dated Mar. 14, 2016, issued in counterpart Chinese Patent Application No. 201280031675.1, with English translation. (9 pages).
Office Action dated Apr. 26, 2016, issued in counterpart Japanese Patent Application No. 2015-121899, with English translation. (9 pages).
Office Action dated May 10, 2016, issued in counterpart Japanese Patent Application No. 2013-522451, with English translation. (11 pages).
International Search Report, dated Aug. 14, 2012, issued in corresponding application No. PCT/JP2012/004198.
Japanese Written Opinion, dated Aug. 14, 2012, issued in corresponding application No. PCT/JP2012/004198.

(56) References Cited

OTHER PUBLICATIONS

Notification of Transmittal of Translation of the International Preliminary Report on Patentability (form PCT/IB/338) of PCT/JP2012/004198 dated Jan. 16, 2014, with forms PCT/ISA/237 and PCT/IB/373 (8 pages).
Extended European Search Report dated Feb. 4, 2015, issued in European Application No. 12805322.0 (5 pages).
Office Action dated May 21, 2015, issued in counterpart Chinese application No. 201280031675.1 (w/English translation) (9 pages).
Non-Final Office Action dated Dec. 20, 2015, issued in U.S. Appl. No. 14/135,810 (31 pages).
Chinese Office Action dated Jul. 27, 2016, issued in counterpart Chinese Patent Application No. 2012800331675.1 with English translation (17 pages).
Chinese Office Action dated Aug. 10, 2016, issued in counterpart Chinese Patent Application No. 201180039963.7 with English translation (22 pages).
Decision of Refusal dated Aug. 9, 2016, issued in relevant Japanese Patent Application No. 2013-522451, with English translation (6 pages).
Decision of Refusal dated Aug. 30, 2016, issued in relevant Japanese Patent Application No. 2015-121899, with English translation (8 pages).
Office Action dated Nov. 15, 2016, issued in counterpart Chinese Application No. 201280031675.1, with English translation. (21 pages).
Final Office Action dated Oct. 6, 2016, issued in U.S. Appl. No. 14/135,810. (38 pages).

* cited by examiner

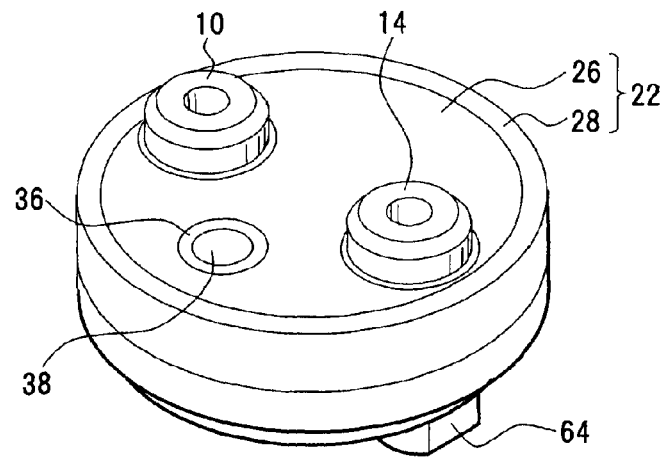
FIG.7A
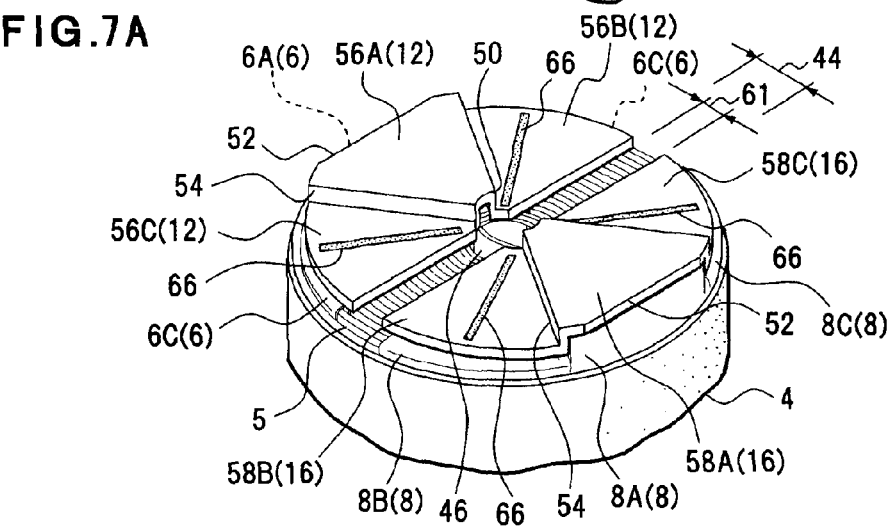
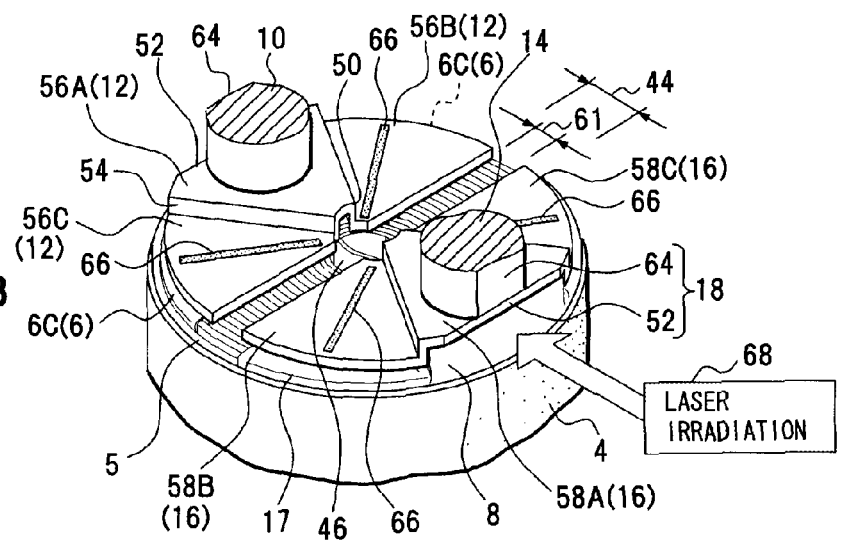
FIG.7B

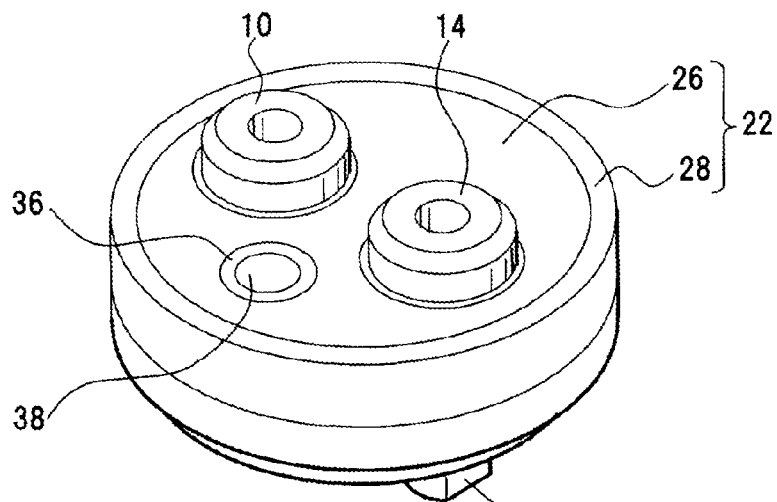
FIG.11A
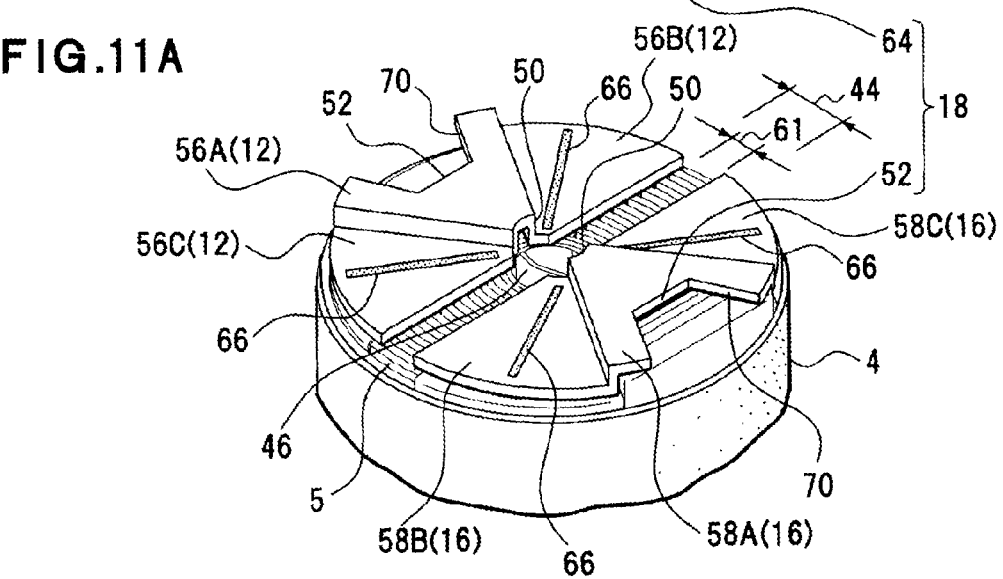
FIG.11B
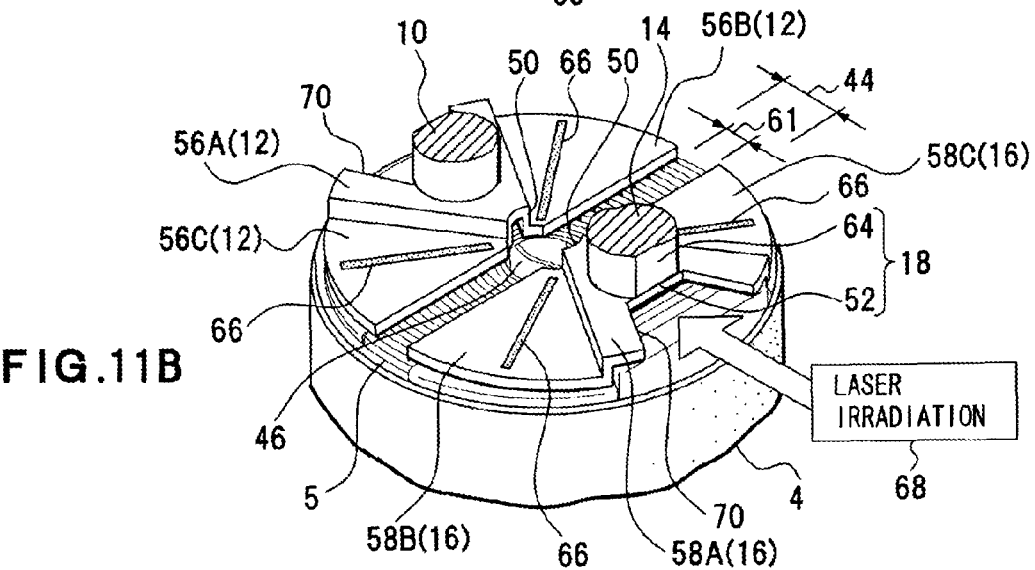

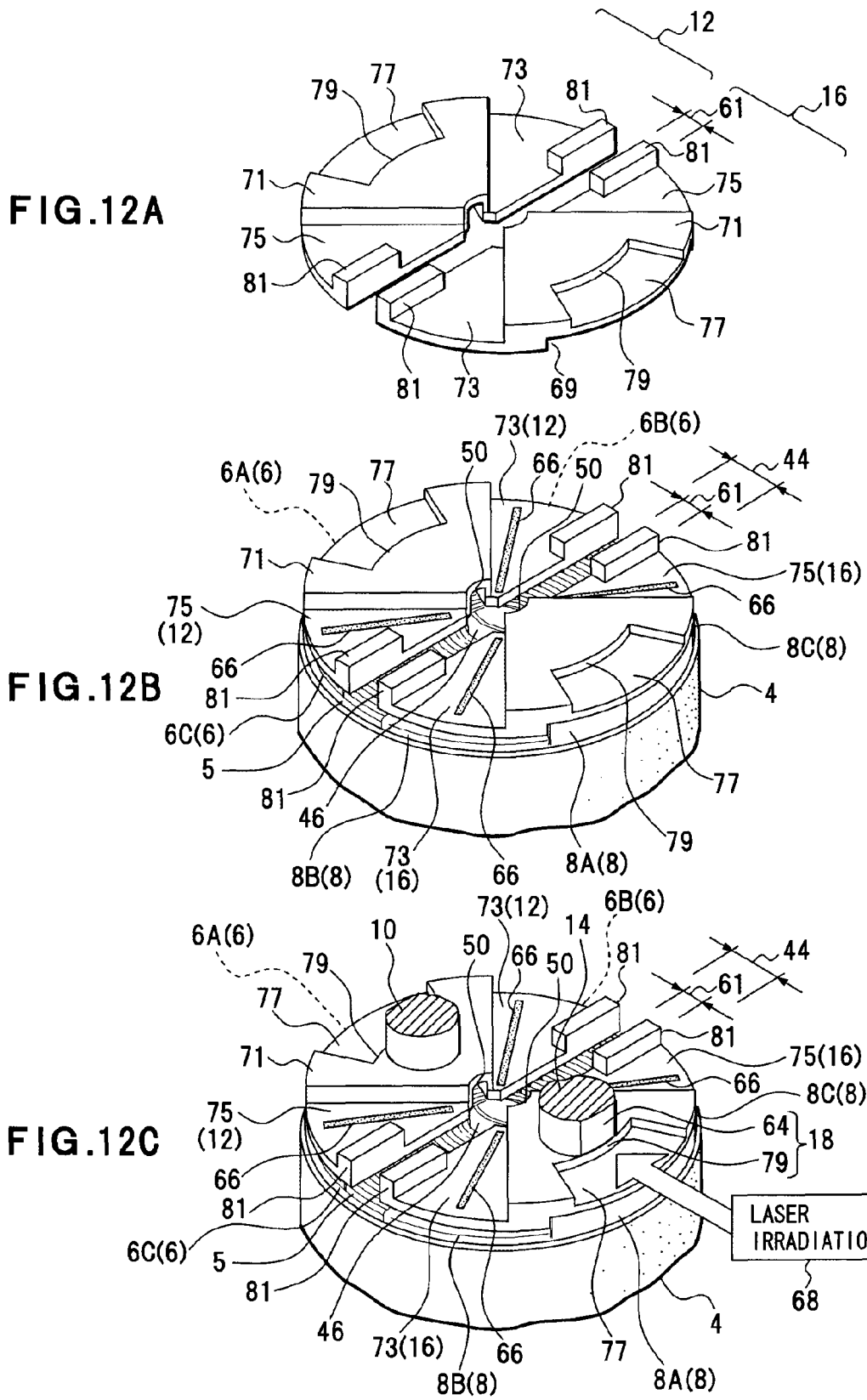

CAPACITOR AND METHOD FOR MANUFACTURING THE SAME

CROSS-REFERENCE TO RELATED APPLICATIONS

This application is a continuation of International Application No. PCT/JP2011/006266, filed on Nov. 9, 2011, which is entitled to the benefit of priority of Japanese Patent Application No. 2010-251352, filed on Nov. 9, 2010, Japanese Patent Application No. 2010-251355, filed on Nov. 9, 2010, Japanese Patent Application No. 2010-251356, filed on Nov. 9, 2010, Japanese Patent Application No. 2011-035484, filed on Feb. 22, 2011, Japanese Patent Application No. 2011-160248, filed on Jul. 21, 2011, and Japanese Patent Application No. 2011-160247, filed on Jul. 21, 2011, the contents of which are hereby incorporated by reference.

BACKGROUND OF THE INVENTION i) Field of the Invention

The present invention relates to connection between capacitor elements and external terminals that are in sealing members sealing openings of outer packaging members of capacitor elements, and relates to capacitors that use laser welding for their connection, for example, capacitors such as electrolytic capacitors and electric double layer capacitors, and methods for manufacturing such capacitors.

ii) Description of the Related Art

It is necessary for capacitor elements and external terminals to be electrically connected in electric double layer capacitors or electrolytic capacitors. Such electrical connection provides courses for reducing internal resistance of elements and contact resistance of connecting portions.

Concerning such electrical connection, the following are known: to provide current collector terminals for the end-faces of elements (for example, Japanese Patent Application Laid-Open Publication No. H11-219857); to provide an anode current collector plate for one end-face of each wound element, and a cathode current collector plate for the other end-face (for example, Japanese Patent Application Laid-Open Publication No. 2001-068379); to provide a current collector plate so that the current collector plate covers current collector foil which is bare over an end-face of each wound element, and to connect the current collector plates and the current collector foil by welding (for example, Japanese Patent Application Laid-Open Publication No. 2007-335156); and to use current collector plates for connection between encapsulating cases and elements and for connection with external terminals (for example, Japanese Patent Application Laid-Open Publication No. 2010-093178).

Multi-layered capacitor elements, which provide connection terminals for their element end faces, are also known (for example, Japanese Patent Application Laid-Open Publication No. H6-275476).

BRIEF SUMMARY OF THE INVENTION

In the structure providing current collector plates for each end-face of wound elements, it is necessary to ensure connection, distance between external terminals of the anode and cathode sides and current collector plates if the external terminals are placed, so as to be adjacent to outer packaging members that cover the outsides of wound elements. Also, inner and outer sides of wound elements have different distribution of the internal resistance. Thus, courses for this are needed, and it is necessary to pay attention to connection between elements and current collector plates. The structure using current collector plates can reduce internal resistance of elements. However, the reliability of the connection may be reduced and/or the connection resistance may get high according to stress that is applied in the middle of the manufacture to current collector plates intervening between external terminals and elements.

As to such connection, there is a little space between capacitor elements and sealing members. If this space is enlarged so that clearance necessary for connection members and the connection is increased, the resistance is increased as much as the clearance is increased, and the size of the height of capacitors also increases. If this clearance (distance) is decreased, the space is narrowed so that capacitors can become compact. However, this brings problems of troublesome connection and incomplete connection because clearance for the connection between capacitor elements and sealing members is decreased.

In the structure providing current collector plates for element end-faces of capacitor elements and connecting with external terminal members such as external terminals, current collector plates and external terminal members are connected by welding. Laser welding or electron beam welding are used for this connection. In this welding, welded portions are irradiated with laser beams or electron beams, and metal of welded parts are welded to be united. In such welding, current collector plates and external terminals need to be in contact with each other because welded portions are irradiated with laser beams or electron beams, and the accuracy of processing that is enough for welding is required for the contact portions. However, if the accuracy of processing current collector plates and external terminal members is low because the accuracy of the shape of each current collector plate and external terminal member is different from each other etc., gaps are generated between contact faces of current collector plates and external terminal members.

A problem in a case where such contact faces between which gaps are generated are irradiated with laser beams or electron beams is that gaps vary welded areas to make the accuracy of the welding worse. A problem in a case where gaps between contact faces are large is that welded ranges are narrowed, connection strength between current collector plates and external terminal members is decreased, the connection resistance gets higher, etc.

There is no disclosure or suggestion as to the above requests and problems in Japanese Patent Application Laid-Open Publication No. H11-219857, Japanese Patent Application Laid-Open Publication No. 2001-068379, Japanese Patent Application Laid-Open Publication No. 2007-335156, Japanese Patent Application Laid-Open Publication No. 2010-093178, and Japanese Patent Application Laid-Open Publication No. H6-275476, and there is no disclosure or suggestion as to structures for solving them.

It is therefore an object of the present invention to achieve reduction of the resistance, the simple and robust connection structure, and facile connection of capacitors in view of the above problems.

It is another object of the present invention to provide capacitors of good accuracy of welding and of increased connection strength between current collector plates and external terminal members without being affected by the accuracy of processing of the current collector plates and the external terminal members in view of the above problems.

According to first aspect of the embodiments, a capacitor includes a capacitor element that is a wound element or an element other than the wound element, and that includes electrode bodies each of which is in an anode side and a cathode side, and separators that intervenes between the electrode bodies; a sealing member that seals an opening of a case member accommodating the capacitor element; at least one electrode protrusion that protrudes from one of the electrode bodies on an element end-face of the capacitor element, at least one of current collector plate that is connected to the electric protrusion; and at least one terminal member that is disposed in the sealing member, and is superposed on the current collector plate, a side face part of the terminal member being welded to a side face part of the current collector plate.

In the above capacitor, preferably, the electrode protrusion may be an aggregate that is formed by part of one electrode body, which is in the electrode bodies, and is bent toward an element center of the capacitor element to be molded on the element end-face, and may be joined to the current collector plate.

In the above capacitor, preferably, the electrode protrusion may be an anode protrusion that protrudes from the electrode body in the anode side of the capacitor element on the element end-face, or a cathode protrusion that protrudes from the electrode body in the cathode side of the capacitor element on the element end-face, or the capacitor may include two of the electrode protrusions, which are the anode protrusion and the cathode protrusion, on a same element end-face same as the element end-face, or which are the anode protrusion and a cathode protrusion that protrudes from the electrode body in the cathode side on an element end-face different from the element end-face, where the anode protrusion protrudes.

In the above capacitor, preferably, when the anode protrusion and the cathode protrusion are placed on the element end-face of the capacitor element that is common thereto, the anode protrusion and the cathode protrusion may be isolated by arrangement of an isolation distance or may be insulated by placement of an insulating member.

In the above capacitor, preferably, the electrode protrusion may be formed over the element end-face of the capacitor element; and the current collector plate may include at least one first welded face that is welded to a welded face which is formed on the electrode protrusion, and a second welded face that is provided for the side face part crossing the first welded face, and is welded to the terminal member.

In the above capacitor, preferably, the electrode protrusion may include a plurality of sections that are formed by each division with a predetermined angle that uses an element center of the element end-face, and by bending toward the element center with a certain bending angle or each different bending angle; and at least one welded face that is formed on the element end-face by the sections.

In the above capacitor, preferably, the current collector plate may include a flat part that protrudes from the side face part welded to the terminal member in a direction of an outer circumference.

In the above capacitor, preferably, the terminal member may be welded to the current collector plate by laser welding or electron beam welding, and irradiated positions for contact faces of the current collector plate and the terminal member with a laser beam or an electron beam may be varied.

In the above capacitor, preferably, a cover that is formed on the current collector plate or the terminal member may cover contact faces of the current collector plate and the terminal member, and the current collector plate and the terminal member may be welded to each other by irradiation with a laser beam or an electron beam on the cover.

In the above capacitor, preferably, the terminal member may be welded to the current collector plate by laser welding or electron beam welding, and a nugget depth by the laser welding or the electron beam welding may be 1.2 mm or below.

In the above capacitor, preferably, the terminal member may be welded to the current collector plate by fiber laser beam.

According to another aspect of the embodiments, a method for manufacturing a capacitor includes making electrode bodies each of which is in an anode side and a cathode side protrude on an element end-face of a capacitor element that includes the electrode bodies and separators intervening between the electrode bodies, and that is a wound element or an element other than the wound element, and forming at least one electrode protrusion on the element end-face; and superposing at least one terminal, member that is disposed in a sealing member sealing an opening of a case member accommodating the capacitor element, on at least one current collector plate that is connected to the electrode protrusion, and welding a side face part of the terminal member and a side face part of the current collector plate.

Preferably, the above method may further include positioning the side face part of the current collector plate on the side face part of the terminal member, wherein the welding is carried out by using both of the side face parts as a common face.

Preferably, the above method may further include superposing the terminal member on the current collector plate, and making the terminal member and the current collector plate be in contact with each other; and varying irradiated positions for contact faces of the current collector plate and the terminal member with a laser beam or an electron beam, and welding the current collector plate and the terminal member.

Preferably, the above method may further include providing a cover for the terminal member or the current collector plate, which is connected to the electrode protrusion, and covering contact faces of the terminal member and the current collector plate by the cover; and setting an irradiating position that is irradiated with a laser beam or an electron beam at the cover, and welding the current collector plate and the terminal member.

Preferably, the above method may further include superposing the current collector plate on the electrode protrusion, setting a weld line on the current collector plate in a direction crossing the electrode bodies of the capacitor element, and welding the current collector plate to the electrode protrusion along the weld line.

In the above method, preferably, weld lines that are adjacent to each other may be set on current collector plates that face each other across an isolation distance, weld lines that are adjacent to each other in a particular place may be sequentially welded, the particular place being across an element center of the capacitor element, and after that, weld lines in a place other than the particular place may be sequentially welded, and the current collector plates and electrode protrusions of the capacitor element may be welded along the weld lines that are adjacent to each other in each of the particular place and the place other than the particular plate.

Preferably, the above method may further include placing the current collector plate on the electrode protrusion, setting a weld line that extends from a welding start point to a welding end point on the current collector plate, and connecting the current collector plate to the electrode protrusion by irradiation with a beam, the weld line being sequentially irradiated with the beam, power of the beam being varied sequentially or step by step.

Preferably, the above method may further include forming a first connecting face on the current collector plate, which is placed on the element end-face of the capacitor element to be connected to the anode side or the cathode side, the first connecting face being arcuate in a side face direction of the capacitor element forming a second connecting face on the terminal, member, which is connected to the current collector plate, the second connecting face being concentric with the first connecting face on the current collector plate; placing the first connecting face and the second connecting face side by side, and using the capacitor element or a welding means that irradiates the first connecting face and the second connecting face with a beam to rotationally move the capacitor element or the welding means; and welding the first connecting face and the second connecting face, and connecting the current collector plate and the terminal member.

In the above method, preferably, the side face part of the terminal member and the side face part of the current collector plate may be welded to each other by fiber laser beam.

Additional objects and advantages of the present invention will be apparent from the following detailed description of the invention, which are best understood with reference to the accompanying drawings.

BRIEF DESCRIPTION OF THE SEVERAL VIEWS OF THE DRAWING

FIGS. 7A and 7B depict connection between the current collector plates and external terminals over the capacitor element;

FIGS. 11A and 11B depict connection between current collector plates and external terminals according to the third embodiment;

FIGS. 12A to 12C depict current collector plates and connection of the current collector plates according to the fourth embodiment;

DETAILED DESCRIPTION OF THE INVENTION

First Embodiment

The first embodiment is the structure of connecting external terminals to current collector plates, which are connected to an element end-face of a capacitor element, and forming the external terminals on the capacitor element.

Figure 1:
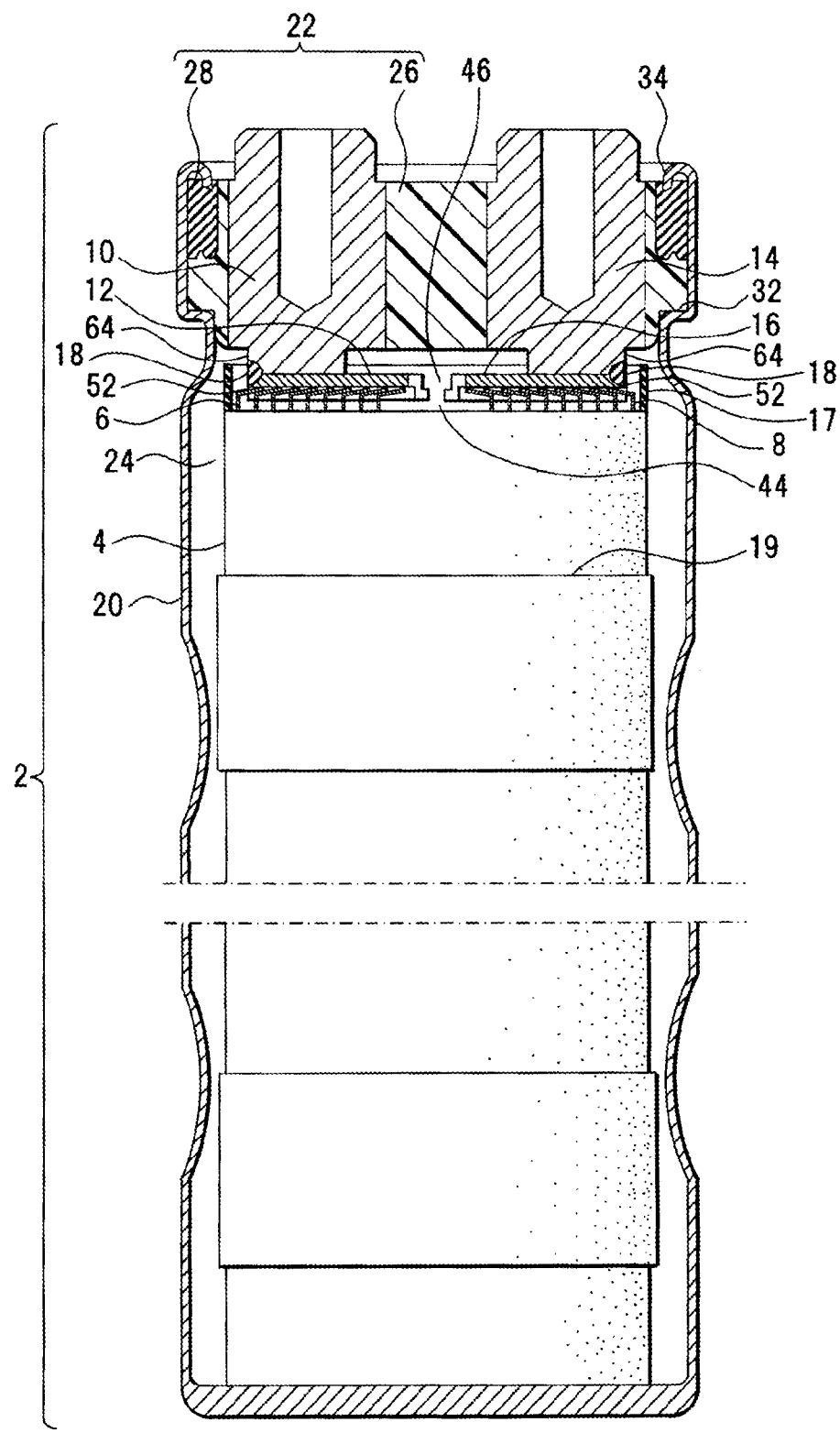
FIG. 1 is a cross sectional view depicting an example of an electric double layer capacitor according to the first embodiment.
Figure 2:
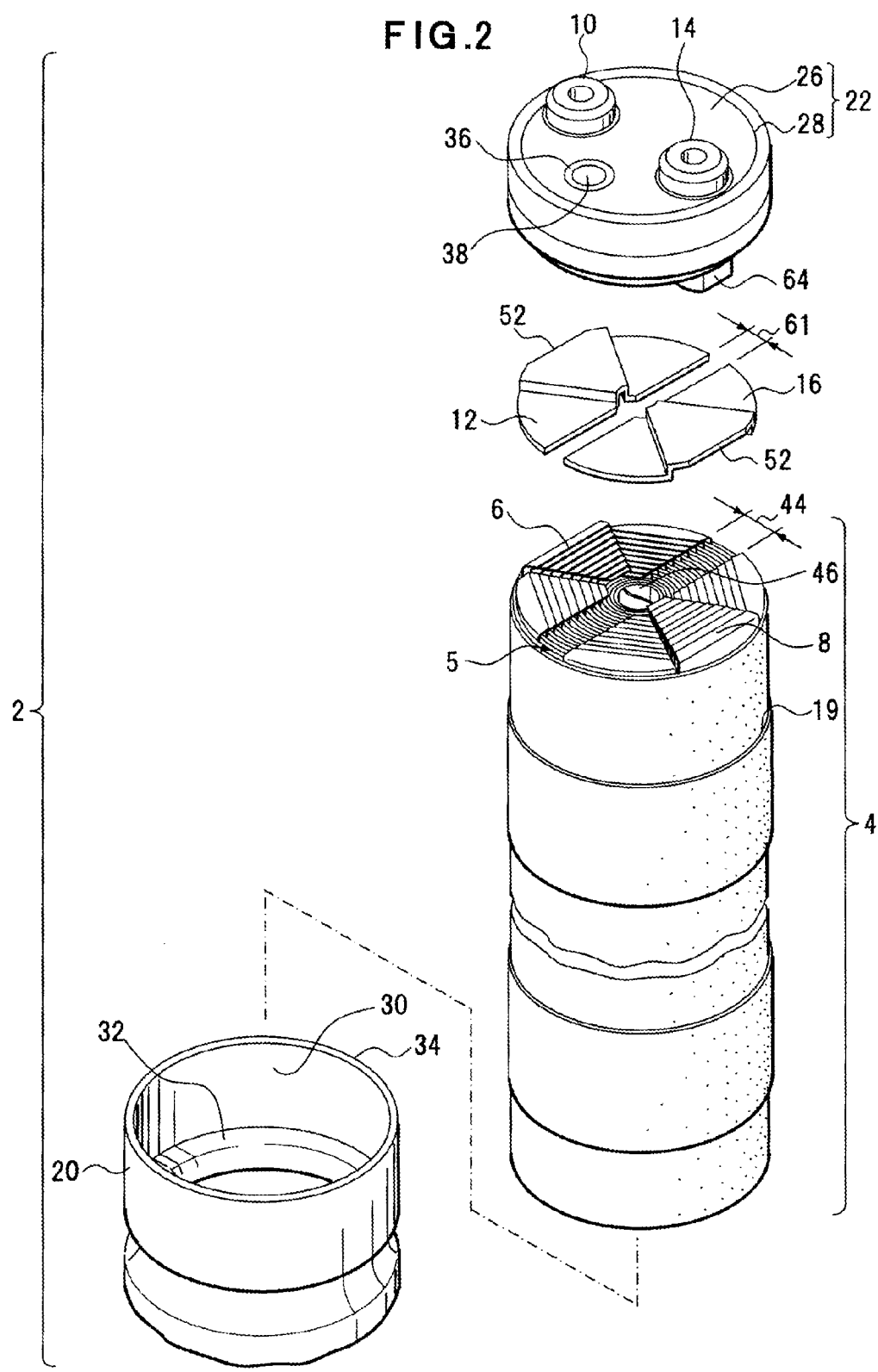
FIG. 2 is an exploded perspective view depicting members of the electric double layer capacitor.

FIGS. 1 and 2 will be referred to concerning the first embodiment. FIG. 1 represents a longitudinal cross-section depicting an example of an electric double layer capacitor and FIG. 2 depicts an example of the electric double layer capacitor, which is partially exploded.

Figure 3:
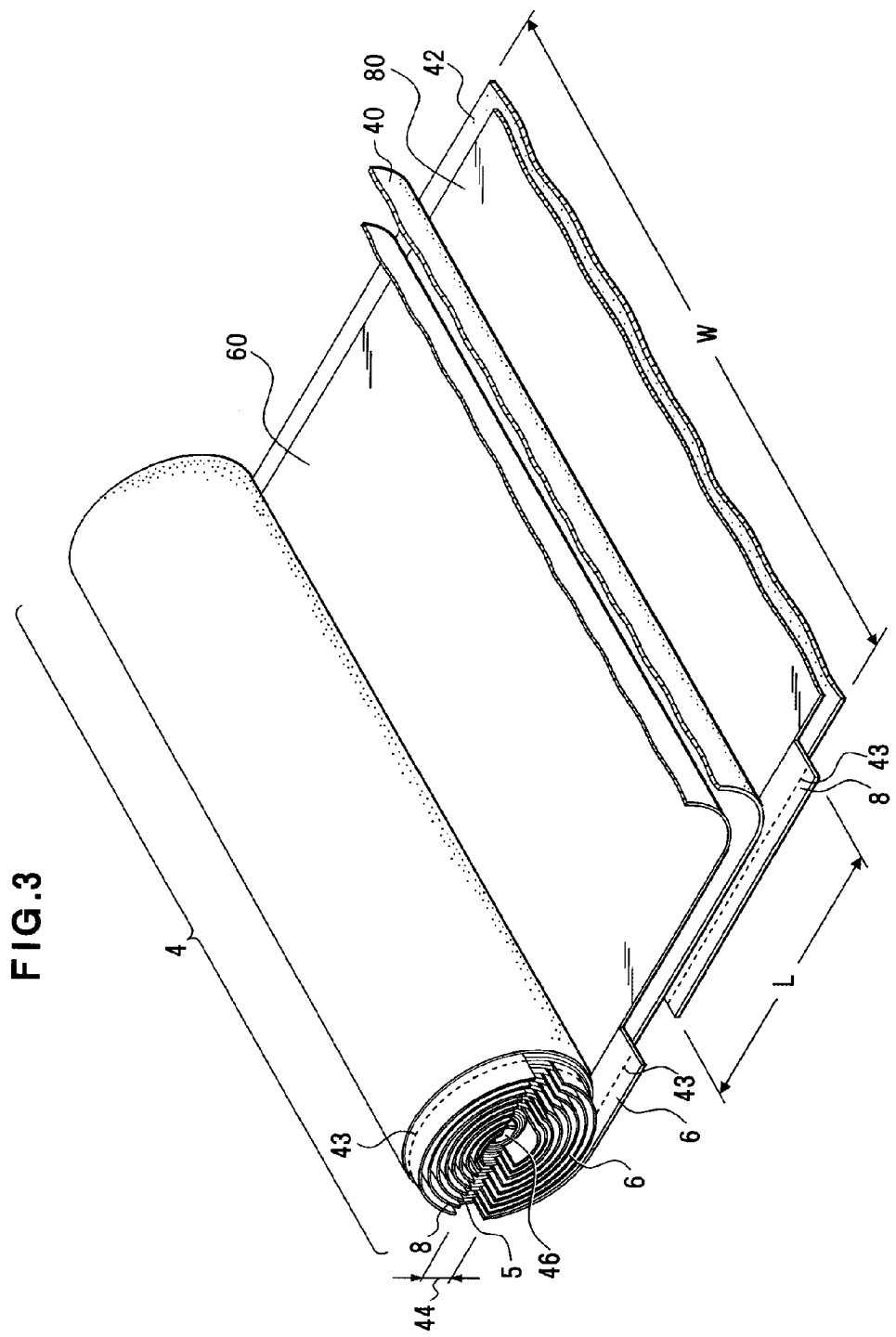
FIG. 3 is a perspective view depicting an example of a capacitor element that is partially exploded.

This electric double layer capacitor 2 is an example of the capacitor of the present invention. As depicted in FIG. 1, an anode part 6 and a cathode part 8 are formed over one element end-face of a capacitor element 4 in this electric double layer capacitor 2. Each anode part 6 and cathode part 8 is an example of an electrode protrusion, and is constituted by part of an electrode body (anode body 60 and cathode body 80: FIG. 3) that is drawn from an element end-face 5 of the capacitor element 4. An anode current collector plate 12 that is interposed between the anode part 6 and an anode terminal 10 is used for connection between the anode part 6 and the anode terminal 10, and a cathode current collector plate 16 that is interposed between the cathode part 8 and a cathode terminal 14 is used for connection between the cathode part 8 and the cathode terminal 14. For example, laser welding or electron beam welding is used for this connection, and 18 is an example of a welded connecting part. The anode terminal 10 and the cathode terminal 14 are terminal members for external connection. The anode terminal 10 is an example of an anode terminal member and the cathode terminal 14 is an example of a cathode terminal member. In this embodiment, an insulating means 17 is disposed around the outer circumferential face of the anode part 6, which is connected to the anode current collector plate 12, and the cathode part 8, which is connected to the cathode current collector plate 16. This insulating means 17 achieves insulation of the capacitor element 4 and an outer packaging case 20. For example, insulating materials such as insulating paper and insulating tape may be used for this insulating means 17.

The capacitor element 4 is a cylindrical body. The anode body 60 (FIG. 3) is drawn to one element end-face, and the anode part 6 is formed. The cathode body 80 (FIG. 3) is drawn to the same element end-face, and the cathode part 8 is formed. Keeping tapes 19 are wound around the capacitor element 4 to prevent the anode body 60 and the cathode body 80 from unwinding.

The outer packaging case 20 and a sealing plate 22 are provided as outer packaging members for the capacitor element 4. The outer packaging case 20 is a molded body that is made of metallic materials having moldability, such as aluminum. The sealing plate 22 is a means for closing an opening 30 of the outer packaging case 20 to keep the airtightness of a space 24. The sealing plate 22 is also a fixing member that fixes the anode terminal 10 and the cathode terminal 14, and constitutes a supporting member for the capacitor element 4. In this embodiment, the sealing plate 22 includes a base part 26 and a sealing part 28. The base part 26 is formed by insulating materials such as synthetic resin. The anode terminal 10 and the cathode terminal 14 are fixed and insulated by the base part 26. The sealing part 28 is made of members of high hermeticity such as rubber rings.

This sealing plate 22 is inserted into the opening 30 of the outer packaging case 20, and is positioned by a fastening step 32 that is formed in the middle of the opening 30. An opening end 34 of the outer packaging case 20 is caulked by a curling process so that the opening end 34 bites into the sealing part 28. Thereby, the outer packaging case 20 is firmly sealed. A through hole 36 and a pressure release mechanism 38 that is made of thin rubber are formed through the base part 26 of the sealing plate 22.

FIG. 3 will be referred to concerning the capacitor element 4. FIG. 3 depicts the capacitor element, which is partially exploded.

As depicted in FIG. 3, this capacitor element 4 includes the anode body 60, the cathode body 80 and separators 40 and 42. The anode body 60 and the cathode body 80 are wound so that the separators 40 and 42 which insulate the anode body 60 and the cathode body 80 individually are sandwiched between the anode body 60 and the cathode body 80 to constitute a cylindrical wound element. For example, aluminum foil is used for base materials of the anode body 60 and the cathode body 80. Polarized electrodes, which include active materials such as activated carbon and binding agents, are formed over both sides of this aluminum foil.

This capacitor element 4 provides an isolation distance 44 of constant width between the anode part 6 and the cathode part 8 that are formed over one end-face. For example, the anode part 6 is formed by the base materials of the anode body 60, and the cathode part 8 is formed by the base materials of the cathode body 80 as well. When the anode body 60 and the cathode body 80 are made from aluminum, the anode part 6 and the cathode part 8 are base material portions of exposed aluminum faces where polarized electrodes are not formed.

A portion that is to form the anode part 6 or the cathode part 8 is arranged as protruding more than the separators 40 and 42 of width W which are insulation means, and is formed so as to have length L that corresponds to the are length of the anode part 6 or the cathode part 8. A fold line 43 is formed on each anode part 6 and cathode part 8, which has the length L and protrudes, as preliminary processing for folding processing so as to slightly expose from the element end-face 5 and to be parallel to the element end-face 5. This fold line 43 is a portion to be folded so that the sides of the anode part 6 and the cathode part 8 that face toward a bending direction is the inside in folding.

As depicted in FIG. 2 (or FIG. 4B), the anode part 6 or the cathode part 8 of the capacitor element 4 is processed to form a state of close contact with the element end-face of the capacitor element 4 before connected to the anode current collector plate 12 or the cathode current collector plate 16.

Figure 4A:
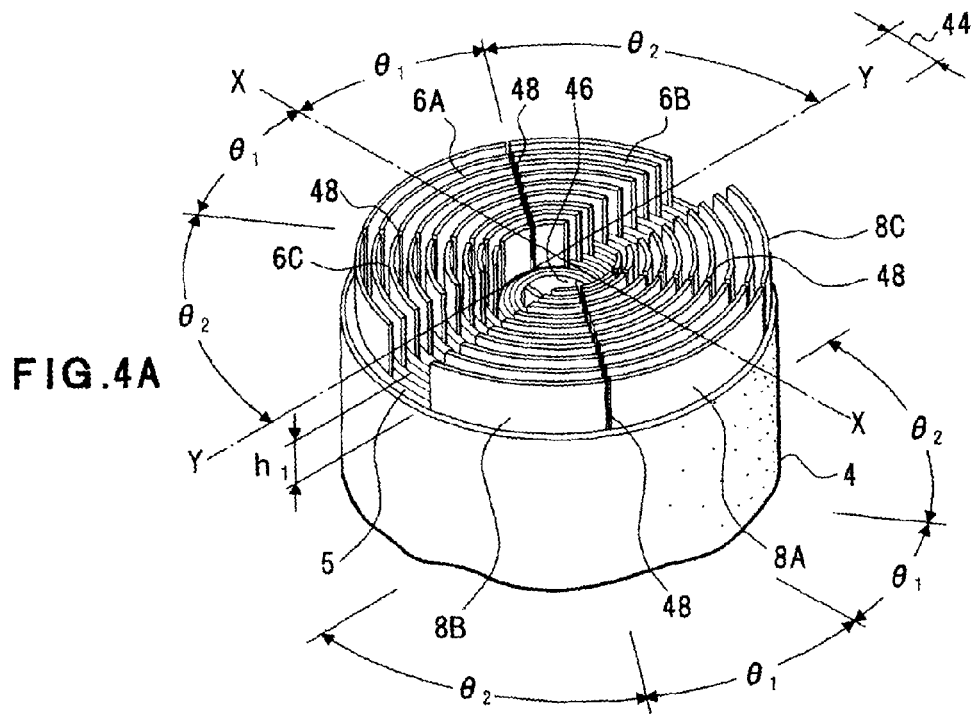
FIGS. 4A and 4B depict an example of each electrode part of the capacitor element before and after molding.
Figure 4B:
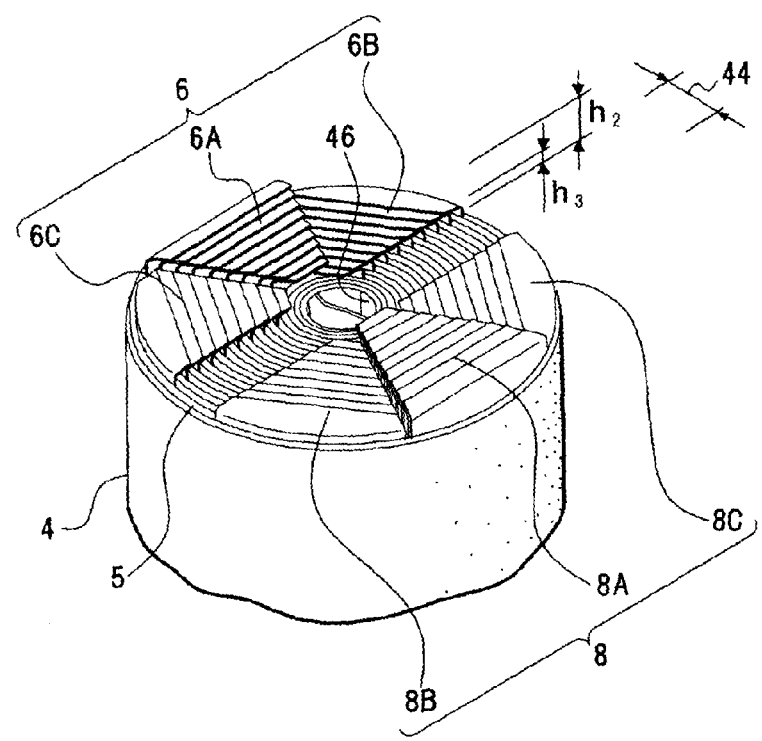

FIGS. 4A and 4B will be referred to concerning the anode part 6 and the cathode part 8 of the capacitor element 4. FIGS. 4A and 4B depict an example of an anode part and a cathode part of a capacitor element. FIG. 4A depicts an anode part and a cathode part before molding. FIG. 4B depicts an anode part and a cathode part after molding. In FIGS. 4A and 4B, the same portions as FIGS. 1, 2 and 3 are denoted by the same reference numerals.

The anode part 6 and the cathode part 8 that constitute electrode protrusions are erected over the element end-face 5 of the capacitor element 4 as depicted in FIG. 4A. The isolation distance 44 of predetermined width is set between these anode part 6 and cathode part 8. A Y axis is taken in the middle of the isolation distance 44, and the X axis is taken so as to be orthogonal to the Y axis. Angles $\theta 1$ and $\theta 2$ ($>\theta 1$) are set on each of the left and right of the X axis as the center, to make sections. A plurality of slits 48 are radially made in portions that make the angle $\theta 1$, using a winding center (core) 46 of the capacitor element 4 as the center. A plurality of sections 6A, 6B and 6C are formed in the anode part 6, which is divided thereinto by the slits 48. As well, a plurality of sections 8A, 8B and 8C are formed in the cathode part 8. For example, if 33 degrees is set for the angle $\theta 1$, each section 6A and 8A is $2\theta 1=66$ degrees. $\theta 2=57$ degrees is set for the angle $\theta 2$ of each section 6B and 6C both of which are formed with holding the section 6A, or that of each section 8B and 8C both of which are formed with holding the section 8A.

As to the depth of the slit 48, for example, height h1 of the anode part 6 and cathode part 8 is set for the protruding length. The sections 6A, 6B and 6C of the anode part 6 and the sections 8A, 8B and 8C of the cathode part 8 are bent in their middle to be detruded toward the winding center of the capacitor element 4, and thus compression molding is performed on them. Thereby, the sections 6A, 6B and 6C, and the sections 8A, 8B and 8C are molded as depicted in FIG. 4B. In this embodiment, welded portions are set for the sections 6B and 6C and the sections 8B and 8C. Then, protruding height h2 of the sections 6A and 8A is set higher than height h3 of the sections 6B, 6C, 8B and 8C, so that the height of the sections 6A, 6B and 6C, and the sections 8A, 8B and 8C is made to correspond to bent shapes of the anode current collector plate 12 and cathode current collector plate 16.

The height size of the anode part 6 and cathode part 8 of the capacitor element 4 can be held down by performing molding on whole of the anode part 6 and the cathode part 8 with the compression toward the element center like the above. In this embodiment, compression molding is performed on the sections 6B and 6C of the anode part 6 to form stable flat connecting faces; and after that, compression molding is also performed on the section 6A, which is not a connecting face, so that the height size of borders that are made by the overlap of the sections 6A and 6B, and of the sections 6A and 6C, is held down. This holding down of the height size of borders also applied to the cathode part 8.

Figure 5A:
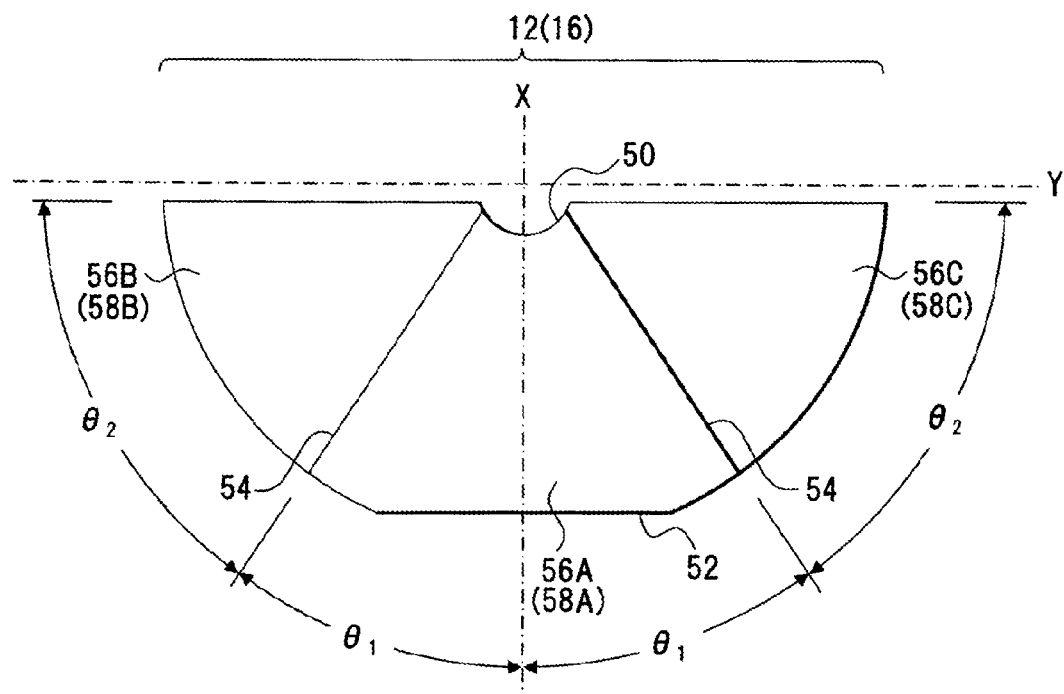
FIGS. 5A and 5B depict an example of a current collector plate.
Figure 5B:
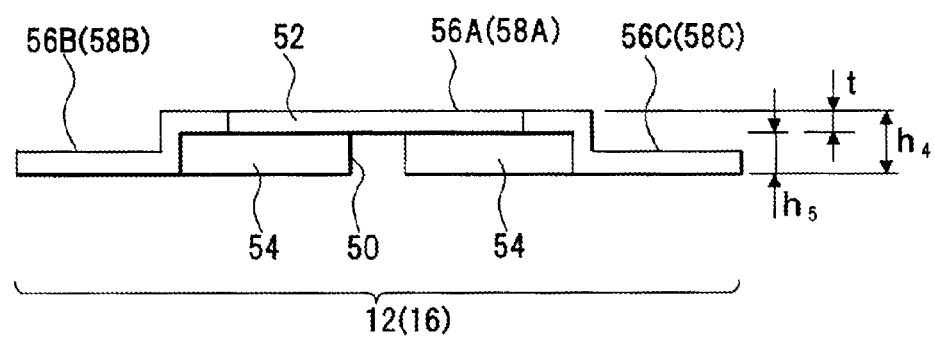

FIGS. 5A and 5B will be referred to concerning the anode current collector plate 12 (or cathode current collector plate 16). FIGS. 5A and 5B depict an example of an anode current collector plate (or cathode current collector plate). FIG. 5A depicts the plan of an anode current collector plate (or cathode current collector plate). FIG. 5B depicts the side of an anode current collector plate (or cathode current collector plate) viewed from the welded connecting part.

This anode current collector plate 12 is formed by a plate of aluminum that is the same material as electrodes, for example. This anode current collector plate 12 has a shape and an area covering the above described sections 6A, 6B and 6C of the anode part 6 (FIGS. 4A and 4B), and including areas for laser welding to the sections 6B and 6C, and to the anode terminal 10. In this embodiment, the anode current collector plate 12 is a half of the element end-face 5 of the capacitor element 4 in size, and is an almost semicircular plate as a shape that ensures the isolation distance 44

An arcuate notch 50 is formed at the center of the chord of the anode current collector plate 12 correspondingly to the winding center 46 of the capacitor element 4 as depicted in FIG. 5A. A connecting face 52 is formed along the arc, part of which is linearly cut off in the orthogonal direction of the X axis, using the X axis as the center. A terminal connecting part 56A and element connecting parts 56B and 56C that are arcuate are also formed over this anode current collector plate 12 by steps 54 as depicted in FIG. 5B. The steps 54 are formed by bending the anode current collector plate 12 perpendicularly, so that an angle set on each left and right of the arcuate notch 50, that is, each left and right of the X axis, as the center is θ1. The terminal connecting part 56A, and the element connecting parts 56B and 56C are formed flat, and make parallel planes with the steps 54 therebetween.

If the height of the terminal connecting part 56A is h4, the thickness of the anode current collector plate 12 is t, and the height inside the terminal connecting part 56A is h5 concerning this anode current collector plate 12, the following is set:

$$h5=h4-t\geq h2-h3 \quad (1)$$

Thus, the height h5 inside the terminal connecting part 56A absorbs the difference Δh (=h2−h3) between the protruding height h2 of the sections 6A and 8A and the height h3 of the sections 6B, 6C, 8B and 8C, and the anode current collector plate 12 adheres to the sections 6B and 6C and is disposed while housing the section 6A. As to the thickness t of the anode current collector plate 12, the thickness of the portion of each element connecting part 56B and 56C and terminal connecting part 56A can be different from each other. For example, the thickness of the terminal connecting part 56A can be set thicker (over 1.2 times) than that of the element connecting parts 56B and 56C. Thereby, heat generated on the element connecting parts 56B and 56C in laser welding to the anode part 6 is absorbed by the terminal connecting part 56A of a certain thickness, and the connection accuracy of laser welding is improved.

Such a structure and relationship between the other members apply to the cathode current collector plate 16 as well.

Figure 6:
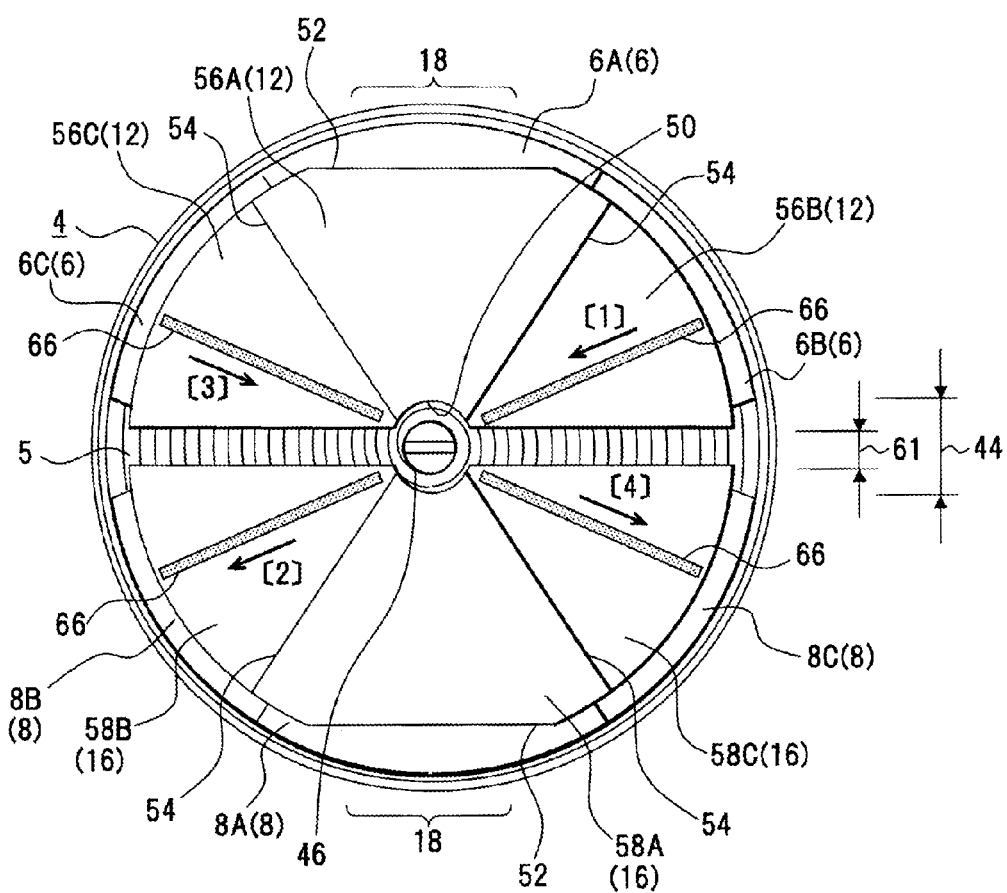
FIG. 6 depicts the capacitor element including the current collector plates, which are irradiated with lasers.

FIG. 6 will be referred to concerning the connection between the anode current collector plate 12 and the anode part 6 of the capacitor element 4, and the connection between the cathode current collector plate 16 and the cathode part 8 of the capacitor element 4. FIG. 6 depicts an example of arrangement and a connected state of an anode current collector plate and a cathode current collector plate over an element end-face of a capacitor element.

As depicted in FIG. 6, the anode current collector plate 12 and the cathode current collector plate 16 are arranged over one end-face of the capacitor element 4 with the winding center 46 as the center. The arcuate notch 50 is positioned along the winding center 46. A space 61 that corresponds to the isolation distance 44 between the anode part 6 and the cathode part 8 is set. The section 6A of the anode part 6 of the capacitor element 4 is positioned below the terminal connecting part 56A, to allow the section 6A to adhere to the anode current collector plate 12, and the sections 6B and 6C of the anode part 6 of the capacitor element 4 are positioned below the element connecting parts 56B and 56C, to allow the sections 6B and 6C to adhere to the anode current collector plate 12. On laser irradiated connecting parts 66, the sections 6B and 6C, and the element connecting parts 56B and 56C are partially or entirely welded to be connected by laser irradiation that starts from the circumference side of the capacitor 4 toward the element center. Such connection is applied to the cathode current collector plate 16 as well.

In this embodiment, as depicted in FIG. 6, portions that are irradiated with lasers are two each of which is on the element connecting parts 56B and 56C, and 58B and 58C separated by the steps 54 that are on each anode current collector plate 12 and cathode current collector plate 16, that is, the laser irradiated connecting part 66. In this case, laser irradiation is performed as indicated by arrows [1], [2], [3] and [4] that denote the laser irradiated connecting parts 66. In this laser irradiation, the capacitor element 4 is shielded by inert gases such as an argon gas and a helium gas as shielding gases, so that the influence of laser heat or spatters on the capacitor element 4 is avoided.

[1] In this laser irradiation, the element connecting part 56B on one anode current collector plate 12 is linearly irradiated from the outer circumference side of the capacitor element 4 toward the element center.

[2] Next, the element connecting part 58B on the other cathode current collector plate 16 that faces across the element center 46 is linearly irradiated from the element center side toward the outer circumference of the element. Thereby, welding is done by a sequence of these operations.

[3] As well, in the laser irradiation, the element connecting part 56C on one anode current collector plate 12 is linearly irradiated from the outer circumference side of the capacitor element 4 toward the element center.

[4] Then, the element connecting part 58C on the other cathode current collector plate 16 that faces across the element center 46 is linearly irradiated with lasers from the element center side toward the outer circumference of the element. Thereby, welding is done by a sequence of these of these operations.

As the above, the anode part 6 is connected to the anode current collector plate 12, and the cathode part 8 is connected to the cathode current collector plate 16 by a sequence of the operations of linear irradiation with lasers across the element center 46. That is, weld lines (laser irradiated connecting parts 66) that extend in the diameter direction of the capacitor element 4 across the winding center 46 are set to weld the anode part 6 to the anode current collector plate 12, and the cathode part 8 to the cathode current collector plate 16. Thus, time for welding for the connection between the anode part 6 and the anode current collector plate 12, and the cathode part 8 and the cathode current collector plate 16 can be shortened, and the manufacturing steps can be simplified. A sequence of the operations of the laser irradiation [1] and [2] is repeated twice. Or, it is also possible to further reduce the connection resistance by repeating a sequence of the operations of the laser irradiation [1] to [4] twice to arrange welded parts that are close to each other. While the connection can be done by a sequence of the operations of the laser irradiation [1] and [2], the element connecting parts 56B, 56C, 58B and 58C of the anode current collector plate 12 and the cathode current collector plate 16 can be individually connected by linear irradiation from the element center side toward the outer circumference of the element, or the like.

Concerning sequential operations of the laser irradiation [1] to [4], the same part is not sequentially irradiated with lasers, but laser welding of [1] to [4] is done, and then, the laser irradiation of [1], to [4] is carried out again. Thereby, a time interval between the operations of laser irradiation on the same part can be provided. As a result, cooling of laser irradiated portions can be achieved, and the stability of the connection by laser welding is also achieved. It is possible to provide time intervals and carry out laser irradiation on the same part several times. However, because the first laser welding of [1] to [4] is done first and then, the laser welding of [1] to [4] is done again, laser irradiation can be sequentially carried out while an interval for cooling is taken, to make it possible to achieve shorter time for welding by laser irradiation.

Concerning sequential operations of the laser irradiation [1] to [4], it is preferable to sequentially or step by step attenuate laser power for weld lines that extend from start points to end points of laser irradiation. Specifically, laser power is sorted by three segments that are provided between the start point and the end point into laser power Pa for a start point segment, laser power Pb for a middle segment and laser power Pc for an end point segment. The laser power is attenuated like Pa>Pb and Pb>Pc. The largest value is set for the laser power Pa for the start point segment, which is, for example, in the range of 50 W to 3,000 W. Not more than 90% of the laser power Pa is set for the laser power Pb, and not more than 80% of the laser power Pa is set for the laser power Pc. Welding energy applied to the current collector plates 12 and 16, the anode part 6 and the cathode part 8 can be equalized, the connectivity can be improved, and the stable connection by welding can be realized by sequentially or step by step attenuating laser power for weld lines that extend from start points to end points of laser irradiation like the above. That is, weld lines (laser irradiated connecting parts 66) on the anode current collector plate 12 and the anode part 6, or on the cathode current collector plate 16 and the cathode part 8 for which irradiation with lasers is carried out, and the vicinity thereof are heated and if laser irradiation is done along the weld lines, heated points move successively as lasers scan the points for irradiation, to bring a melting state successively without setting equalized laser power. Thus, thermal energy that is brought by laser irradiation and is applied to welded parts is equalized although laser power is attenuated sequentially step by step. Therefore, the connectivity of the anode current collector plate 12 and the anode part 6, or that of the cathode current collector plate 16 and the cathode part 8 is improved.

As depicted in FIGS. 4A and 4B, the anode part 6 and the cathode part 8 are formed over the element end-face 5 of the capacitor element 4. The isolation distance 44 is set between the anode part 6 and the cathode part 8, so that the anode part 6 and the cathode part 8 are not in contact with each other when molded by compression toward the center. Therefore, the anode part 6 and the cathode part 8 are not formed in the vicinity of the winding center 46 (within 2 mm of the element center) of the capacitor element 4. Further, the more portions form the anode part 6 and the cathode part 8 (or the larger their areas are), the less the resistance is. Thus, for example, the range of 3 mm to 15 mm is set for the isolation distance 44, so that the anode part 6 and the cathode part 8 is not in contact with each other and the reduction of the resistance can be achieved. The insulating means 17 (FIG. 1) such as insulating paper and insulating tape may be placed around the outer circumferential face of the anode part 6 that is connected to the anode current collector plate 12 and the cathode part 8 that is connected to the cathode current collector plate 16 so that the anode part 6 and the cathode part 8 are not in contact with the outer packaging case 20 even if there occurs slippage or the like on the outermost circumference of the capacitor element 4 when compression molding is carried out on the anode part 6 and the cathode part 8. Insulation from the outer packaging case 20 is achieved by placing this insulating means 17 around the outer circumference so as to cover the anode terminal 10, the cathode terminal 14, the anode current collector plate 12 and the cathode current collector plate 16 in addition to the anode part 6 and the cathode part 8.

FIGS. 7A and 7B will be referred to concerning the connection between the anode terminal 10 and the anode current collector plate 12, and the connection between the cathode terminal 14 and the cathode current collector plate 16. FIGS. 7A and 7B depict the connection between an anode terminal and an anode current collector plate, and the connection between a cathode terminal and a cathode current collector plate. FIG. 7A depicts the state before the anode terminal and the anode current collector plate, or the cathode terminal and the cathode current collector plate are connected. FIG. 7B depicts laser irradiation.

As depicted in FIGS. 7A and 7B, the anode terminal 10 and the cathode terminal 14 in the sealing plate 22 are positioned on the capacitor element 4 where the anode current collector plate 12 and the cathode current collector plate 16 are connected. A terminal side connecting face 64 is formed over each side face part of the anode terminal 10 and cathode terminal 14. This terminal side connecting face 64 is a side wall face that forms the coinciding face with the connecting face 52 of each anode current collector plate 12 and cathode current collector plate 16. Then, if these connecting face 52 and terminal side connecting face 64 are made to coincide and laser irradiation 68 is carried out thereon, the above described welded connecting part 18 is welded by laser, to allow the connecting face 52 and the terminal side connecting face 64 to be welded to each other.

Therefore, the anode terminal 10, which is an external terminal, is connected to the anode part 6 of the capacitor element 4 through the anode current collector plate 12 by the welded connecting part 18 from the laser irradiation. 68. Also, the cathode terminal 14, which is an external terminal, is connected to the cathode part 8 of the capacitor element 4 through the cathode current collector plate 16 by the welded connecting part 18 from the laser irradiation 68. Thus, external terminals are formed on the capacitor element 4.

The space (distance) between the capacitor element 4 and the sealing plate 22 is as small as possible because the larger the space (distance) between the capacitor element 4 and the sealing plate 22 is, the more the resistance is and the larger the size of the height of the electric double layer capacitor 2 is. In order to connect the anode terminal 10 and the anode current collector plate 12 and connect the cathode terminal 14 and the cathode current collector plate 16 in such a small space, each connecting face 52 is arranged to coincide with the terminal side connecting faces 64, to form a common face, and a portion on it is welded by the laser irradiation 68 by which welding can be performed locally to achieve the simplification and the intensification of welding as described above. The range of 05 mm to 5 mm is set for each anode current collector plate 12, cathode current collector plate 16, anode terminal 10 and cathode terminal 14 in thickness (for each connecting face 52 and terminal side connecting face 64 in size of the height). This is the size that permits laser welding, makes it difficult to increase the internal resistance, and can make the size of the height of the electric double layer capacitor 2 small.

Each connecting face 52 and terminal side connecting face 64 is formed into a flat face by notch, but is not limited to a flat face. Each connecting face 52 and terminal side connecting face 64 may be a curve, and just needs to be a face coinciding with each other. Each connecting face 52 and terminal side connecting face 64 may be an inclined face (taper face). There may occur gaps between the connecting face 52 and the terminal side connecting face 64 according to the accuracy of processing.

The connecting face 52 and terminal side connecting face 64 are preferably placed in the vicinity of the outer circumferential face of the capacitor element 4 in order to prevent excessive stress on other members (the anode part 6 and the cathode part 8) in laser irradiation. Specifically, each connecting face 52 and terminal side connecting face 64 is preferably placed within 10 mm of the outer circumferential face of the capacitor element 4, for example.

Features and advantages of the electric double layer capacitor 2 of the first embodiment described above will be listed as follows.

(1) Connecting areas for the anode part 6 and the cathode part 8 of the capacitor element 4 are respectively set in positions different from connecting areas for the anode terminal 10 and the cathode terminal 14 over the anode current collector plate 12 and the cathode current collector plate 16. Thus, the connection between electrode parts and current collector plates, and the connection between external terminals and current collector plates can be stabilized, and the reduction of the resistance of the capacitor element and the intensification of the connection can be achieved.

(2) Over one end-face of the capacitor element 4, the anode part 6 is formed by base materials of the anode body 60, and the cathode part 8 is formed by base materials of the cathode body 80, the anode part 6 is connected to the anode terminal 10 via the anode current collector plate 12, and the cathode part 8 is connected to the cathode terminal 14 via the cathode current collector plate 16. Thus, the simplification of the terminal connection is achieved. The connection can be even facilitated.

(3) The space occupancy rate that is the rate of the space of connecting portions per the space 24 in the outer packaging case 20 is extremely low.

(4) The capacitor element 4 is robustly supported by the sealing plate 22 that is an outer packaging member. That is, the anode part 6 and cathode part 8 of the capacitor element 4 are respectively fixed robustly to the anode terminal 10 and the cathode terminal 14 through the anode current collector plate 12 and the cathode current collector plate 16 by laser welding. Thus, strength to support the capacitor element 4 is improved. As a result, the mechanically robust supporting structure is constituted to make it possible to improve the shockproof of products.

(5) The anode part 6 is formed by a plurality of the side edge parts that are collected from the anode body 60, which is wound as the capacitor element 4 that is a wound element. This anode part 6 is welded to the anode current collector plate 12 by laser. Similarly, the cathode part 8 is formed by a plurality of the side edge parts that are collected from the cathode body 80. This cathode part 8 is welded to the cathode current collector plate 16 by laser. Thus, reduction of the resistance of the capacitor element 4 and the electric double layer capacitor 2 can be achieved, and products whose equivalent series resistance is low can be offered.

(6) It is not necessary to connect tubs to the capacitor element 4 because the anode current collector plate 12 and the cathode current collector plate 16 are used.

(7) A side face of the anode current collector plate 12 or the cathode current collector plate 16 is made to coincide with that of an external terminal (anode terminal 10 or cathode terminal 14). Thus, laser irradiation for them can be stabilized, the connection can be perfected, and the reliability can be improved.

(8) The capacitor element 4 can be protected from laser heat and flying spatters since shielding gases are used in laser irradiation. Thus, deterioration of the characteristics of the capacitor element 4 and the electric double layer capacitor 2, which is a product, can be prevented, and the reliability can be improved.

Second Embodiment

The second embodiment discloses a method for manufacturing the above described capacitor.

Figure 8:
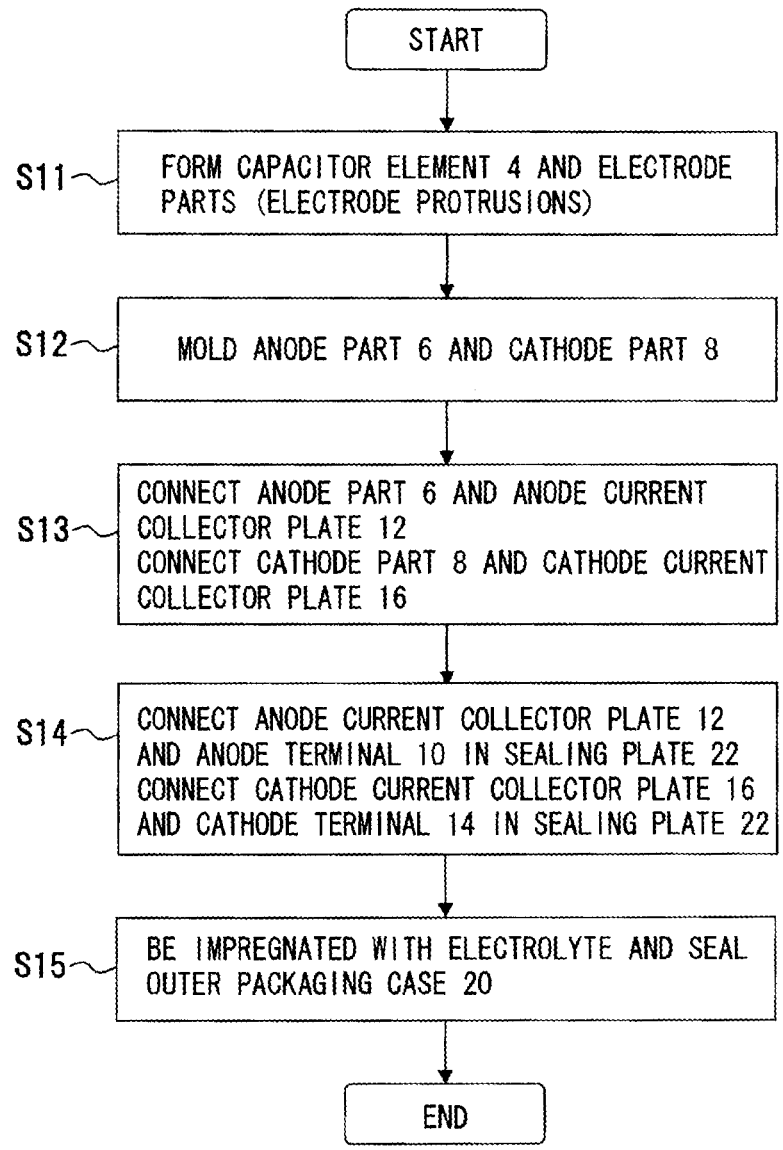
FIG. 8 is a flowchart depicting an example of every manufacturing step of electric double layer capacitor according to the second embodiment.
Figure 9A:
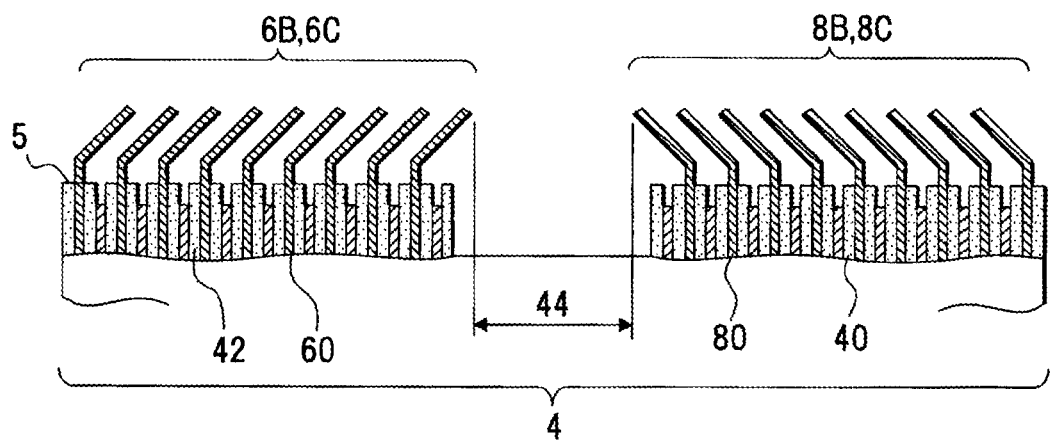
FIGS. 9A and 9B depict molded states of an anode part and a cathode part of a capacitor element.
Figure 9B:
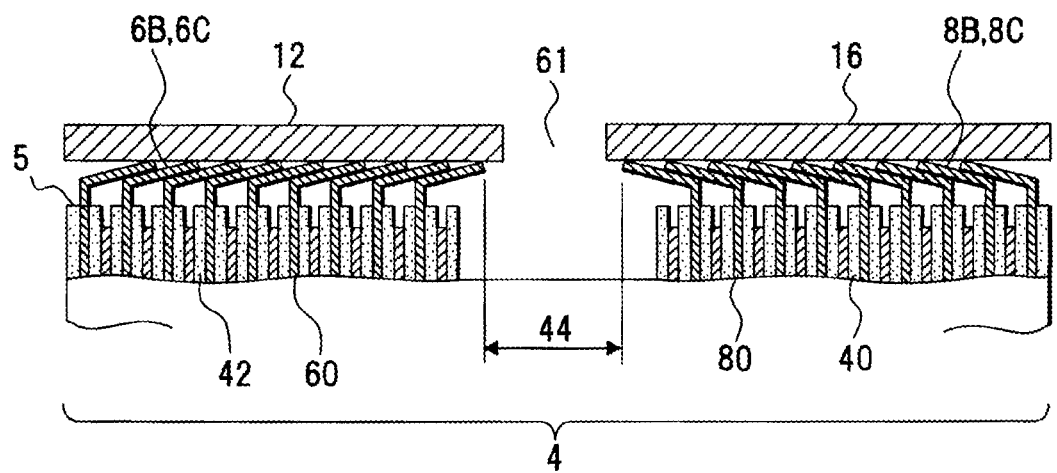
Figure 10A:
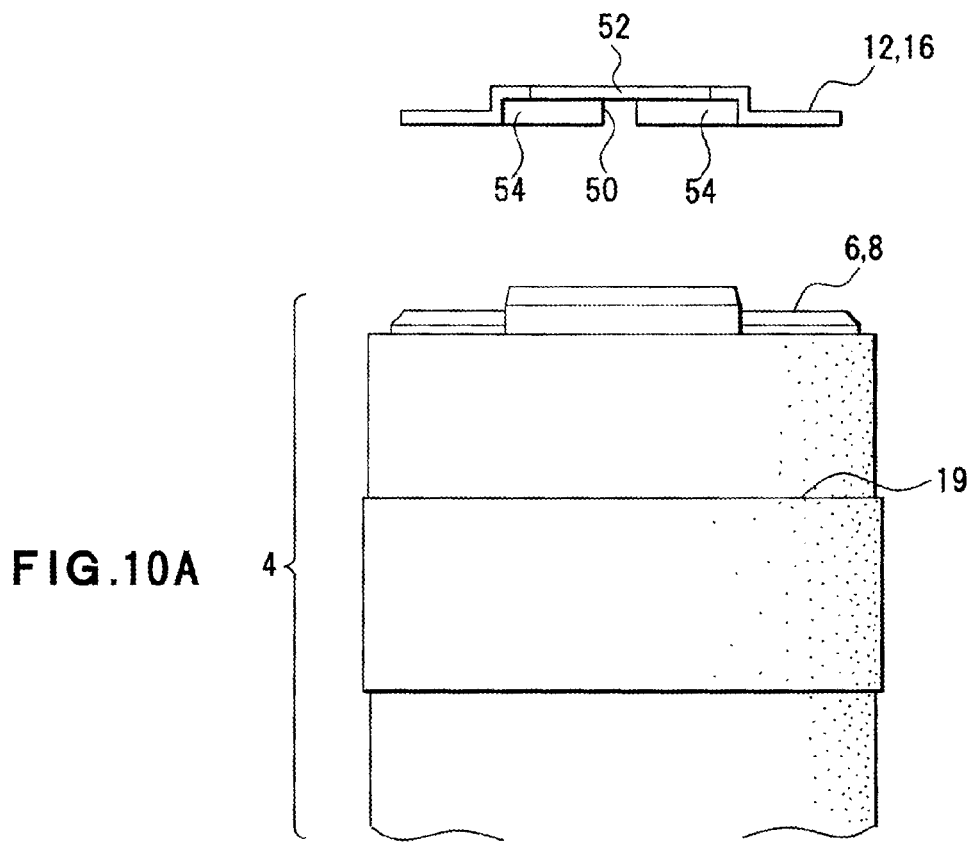
FIGS. 10A and 10B depict connecting steps of the capacitor element and current collector plates.
Figure 10B:
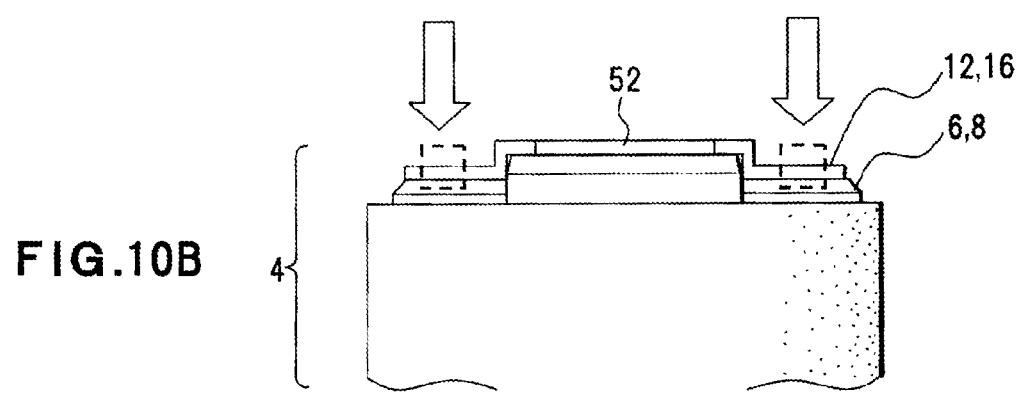

FIGS. 9A, 9B, 10A and 10B will be referred to concerning the second embodiment. FIG. 8 is a flowchart depicting an example of every manufacturing step of electric double layer capacitors according to the second embodiment. FIGS. 9A and 9B depict molded states of an anode part and a cathode part, and FIGS. 10A and 10B depict welding steps of current collector plates and a capacitor element by laser.

A series of these manufacturing steps is an example of the method for manufacturing a capacitor of the present invention, and as depicted in FIG. 8, includes a forming step of the capacitor element 4 and electrode parts (electrode protrusions) (step S11), a molding step of the anode part 6 and the cathode part 8 (step S12), a first connecting step (step S13), a second connecting step (step S14) and an impregnating with electrolyte and sealing step (step S15).

(1) Forming Step of Capacitor Element 4 and Electrode Parts (Electrode Protrusions) (Step S11)

As depicted in FIG. 3, the separators 40 and 42 are sandwiched between the anode body 60 and the cathode body 80, and are cylindrically wound around the winding center 46 to form the capacitor element 4. Part of each anode body 60 and cathode body 80 is made to protrude over the element end-face 5, and the anode part 6 and the cathode part 8 as electrode protrusions are formed over the capacitor element 4. The insulation distance 44 is set between the anode part 6 and the cathode part 8.

(2) Molding Step of Anode Part 6 and Cathode Part 8 (Step S12)

In this molding step, the anode part 6 and the cathode part 8 as electrode protrusions are divided into the above described sections 6A, 6B, 6C, 8A, 8B and 8C as depicted in FIG. 4A, to be bent toward the winding center 46 and molded as depicted in FIG. 4B (step S12). As depicted in FIGS. 9A and 9B, this molding corresponds to the bending shapes of the anode current collector plate 12 and the cathode current collector plate 16, and the sections are molded so as to have the height adherable to the anode current collector plate 12 and the cathode current collector plate 16. FIGS. 9A and 9B depict bent states (molded states) of the sections 6B and 6C of the anode part 6 that is to be connected to the anode current collector plate 12, and the sections 8B and 8C of the cathode part 8 that is to be connected to the cathode current collector plate 16. FIG. 9A depicts a molded state before the anode current collector plate 12 and the cathode current collector plate 16 are placed as described below, and FIG. 9B depicts a molded state after the anode current collector plate 12 and the cathode current collector plate 16 are placed. That is, the sections 6B and 6C of the anode part 6 and the sections 8B and 8C of the cathode part 8 are made to be flat by press of the anode current collector plate 12 and the cathode current collector plate 16 on the anode part 6 and the cathode part 8, or by press of the anode part 6 and the cathode part 8 on the anode current collector plate 12 and the cathode current collector plate 16 to compress the anode part 6 and the cathode part 8. Thus, the sections 6B, 6C, 8B and 8C are caused to adhere to the anode current collector plate 12 and the cathode current collector plate 16. As depicted in FIG. 3, the fold line 43 may be provided in advance on the anode part 6 or the cathode part 8 before the anode part 6 or the cathode part 8 are bent to be molded. The fold line 43 is formed along a line that has constant distance (0.5 mm or over) from the element end-face 5. Because of this, mechanical stress on the portions of the separators 40 and 42, which are at the element end-face, is reduced when the anode part 6 or the cathode part 8 is bent, and a short circuit due to the anode body 60 and the cathode body 80 in contact with each other can be prevented. This fold line 43 is not a scratch but a marking-off line, and can prevent buckling when the anode part 6 and the cathode part 8 are bent. A groove constitutes this fold line 43. The cross-sectional shape of the fold line 43 may be a triangle, rectangle, or curve (R). For example, methods such as pressing, using lasers, and cutting may be used for forming this fold line 43. While only one fold line 43 may be formed as depicted in FIG. 3, a plurality of fold lines 43 may be formed according to the width of the anode part 6 or the cathode part 8. The fold line 43 may be formed on either one side or both sides of the anode part 6 or the cathode part 8. The fold line 43 as one example is formed, so that the side, which faces toward the element center 46 of the element end-face 5, is the inside in folding.

(3) First Connecting Step (Step S13)

In this connecting step (step S13), as depicted in FIG. 10A, the anode current collector plate 12 and the cathode current collector plate 16 are respectively positioned over the anode part 6 and the cathode part 8 of the capacitor element 4. As depicted in FIG. 10B, the anode current collector plate 12 is connected to the anode part 6 and the cathode current collector plate 16 is connected to the cathode part 8 by laser welding. In this laser welding, the capacitor element 4 is shielded by using inert gases such as an argon gas and a helium gas as shielding gases, so that the capacitor element 4 is separated from laser heat and flying spatters.

(4) Second Connecting Step (Step S14)

In this connecting step (step S14), as depicted in FIGS. 7A and 7B, the connecting face 52 of the anode current collector plate 12, which is connected to the anode part 6, is made to coincide with the terminal side connecting face 64 of the anode terminal 10 in the sealing plate 22, to be connected by laser welding. Similarly the cathode terminal 14 in the sealing plate 22 is connected to the cathode current collector plate 16, which is connected to the cathode part 8, by laser welding. In this laser welding, the capacitor element 4 is also shielded by using inert gases such as an argon gas and a helium gas as shielding gases, so that the capacitor element 4 is separated from laser heat and flying spatters.

In this embodiment, as depicted in FIG. 7A, the anode terminal 10 in the sealing plate 22 is positioned on the anode current collector plate 12, which is connected to the anode part 6 of the capacitor element 4, and at the same time, the cathode terminal 14 in the sealing plate 22 is positioned on the cathode current collector plate 16, which is connected to the cathode part 8 of the capacitor element 4. Thereby, as depicted in FIG. 7B, the anode terminal 10 and the cathode terminal 14 are respectively welded by laser. Reference sign 18 is the above described welded connecting part.

Concerning the sealing plate 22, the anode terminal 10 and the cathode terminal 14 are inserted to mold synthetic resin (insert-molding). Thereby, the base part 26 and the sealing part 28 are formed.

(5) Impregnating with Electrolyte and Sealing Step (Step S15).

The outer packaging case 20 accommodates the capacitor element 4 after the capacitor element 4 is impregnated with electrolyte, and is sealed by a curling process for the opening end 34 thereof (step S15). Thus, the electric double layer capacitor 2 (FIG. 1), which is a product, is completed.

According to such manufacturing steps, the above described electric double layer capacitor 2 can be easily manufactured, and the simplification of the terminal connecting steps can be achieved. Thus, capacitors that take the effects as described in the first embodiment can be realized.

Third Embodiment

In the third embodiment, arrangement of external terminals and forms of current collector plates are disclosed.

FIGS. 11A and 11B will be referred to concerning the third embodiment. FIGS. 11A and 11B depict the connection between current collector plates and external terminals according to the third embodiment. FIG. 11A depicts the state before the connection. FIG. 11B depicts laser irradiation during the connection.

The anode terminal 10 and the cathode terminal 14 that are disposed in the sealing plate 22 in this embodiment are arranged on the element end-face 5 of the capacitor element 4 in the vicinity of the winding center 46 as depicted in FIG. 11A. The terminal side connecting face 64 of each anode terminal 10 and cathode terminal 14 is back toward the winding center 46 further than the outer circumference of the capacitor element 4.

In this embodiment, as depicted in FIG. 11A, a recess 70 that is back toward the winding center 46 is formed in each terminal connecting part 56A of the anode current collector plate 12 and terminal connecting part 58A of the cathode current collector plate 16 for the terminal side connecting face 64 of each anode terminal 10 and cathode terminal 14 like the above. The above described connecting face 52 is formed for this recess 70 correspondingly to the terminal side connecting face 64 of the anode terminal 10 or the cathode terminal 14. In this case, on the anode current collector plate 12 or the cathode current collector plate 16, the element connecting parts 56B and 56C, and 58B and 58C constitute flat portions that protrude more toward the outer circumference of the capacitor element 4 than the side ace of the terminal side connecting face 64.

According to such a structure, as depicted in FIG. 11A, the terminal side connecting face 64 and the connecting face 52 can be kept coincide on the same plane, and connection by the laser irradiation 68 as well as the above embodiments can be executed even if the anode terminal 10 and the cathode terminal 14 are arranged on the element end-face 5 of the capacitor element 4 in the vicinity of the winding center 46.

In this embodiment, the recess 70 is formed in each anode current collector plate 12 and cathode current collector plate 16. However, the connecting face 52 may be formed by a protrusion.

Fourth Embodiment

In the fourth embodiment, another form of current collector plates is disclosed.

FIGS. 12A to 12C will be referred to concerning the fourth embodiment. FIGS. 12A to 12C depict current collector plates and the connection between the current collector plates and external terminals according to the fourth embodiment. FIG. 12A depicts current collector plates before the connection with a capacitor element. FIG. 12B depicts the state before the connection with the external terminals. FIG. 12C depicts laser irradiation during the connection.

Each current collector plate 12 and 16 in this embodiment has a form of covering the element end-face 5 of the capacitor element 4 while providing the space 61 therebetween as depicted in FIG. 12A. Depressions 69 that house the sections 6A and 8A are formed in the rear sides of the current collector plates. The depressions 73 and 75 that correspond to the sections 6B, 6C, 8B and 8C of the capacitor element 4 are formed on the surfaces of these current collector plates 12 and 16 while protrusions 71 each of which has a fan shape and is a connecting portion with the sections 6A and 8A of the capacitor element 4 are held therebetween. Each depression 73 and 75 constitutes a flat portion that protrudes toward the outer circumference of the capacitor element 4 more than the connecting part for the anode terminal 10 or the cathode terminal 14, which is an external terminal. A notch 77 is formed in the circumference side of the protrusion 71. The circumference of the protrusion 71, which faces this notch 77, is formed like an arc, to form a connecting face 79 for the anode terminal 10 or the cathode terminal 14. Protrusion parts 81 each of which is a rectangular parallelepiped are formed on the depressions 73 and 75 as means for holding both current collector plates 12 and 16 at once (chucking).

The current collector plates 12 and 16 of this embodiment are disposed while covering the element end-face 5 of the capacitor element 4 as depicted in FIG. 12B. The anode part 6 is connected with the depressions 73 and 75 of the anode current collector plate 12 by laser welding, and the cathode part 8 is connected with the depressions 73 and 75 of the cathode current collector plate 16 by laser welding as well.

As depicted in FIG. 12C, the anode terminal 10 is superposed on the anode current collector plate 12, which is connected to the capacitor element 4, and the cathode terminal 14 is superposed on the cathode current collector plate 16. The connecting face 79, which has the same curve as the terminal side connecting face 64 of the anode terminal 10, is made to coincide with the terminal side connecting face 64 of the anode terminal 10 to be positioned, and the connecting face 79, which has the same curve as the terminal side connecting face 64 of the cathode terminal 14 is made to coincide with the terminal side connecting face 64 of the cathode terminal 14 to be positioned as well. Under this positioned state, the laser irradiation 68 is executed, and thereby, the current collector plates 12 and 16 are respectively connected to the anode terminal 10 and the cathode terminal 14. Each depression 73 and 75 constitutes a flat portion that protrudes toward the outer circumference of the current collector plate 12 or 16 more than the connecting face 79, which is in the protrusion 71 and is connected to the anode terminal 10 or the cathode terminal 14, that is, the side face part that is welded to a terminal member. This flat portion can cover the element end-face 5 of the capacitor element 4.

In such a structure, the element end-face 5 of the capacitor element 4 is covered by the current collector plates 12 and 16, and thus, can be protected from flying spatters due to the laser irradiation 68 on the connecting faces 79. Moreover, the connecting ace 79 can be made to coincide with the terminal side connecting face 64 of each anode terminal 10 and cathode terminal 14, to be welded since being a curve that coincides with each anode terminal 10 and the cathode terminal 14. In short, good laser welding can be executed.

Fifth Embodiment

The fifth embodiment discloses to provide a positioning means for any one of a sealing plate, external terminals, and current collector plates and to decide connection locations for the external terminals and the current collector plates using the positioning means.

Figure 13A:
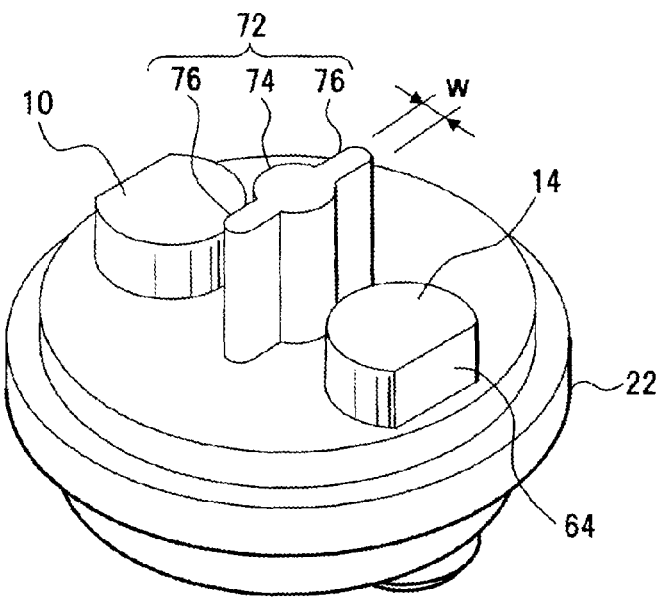
FIGS. 13A and 13B depict connection between current collector plates and external terminals, and positioning of the current collector plates and the external terminals according to the fifth embodiment.
Figure 13B:
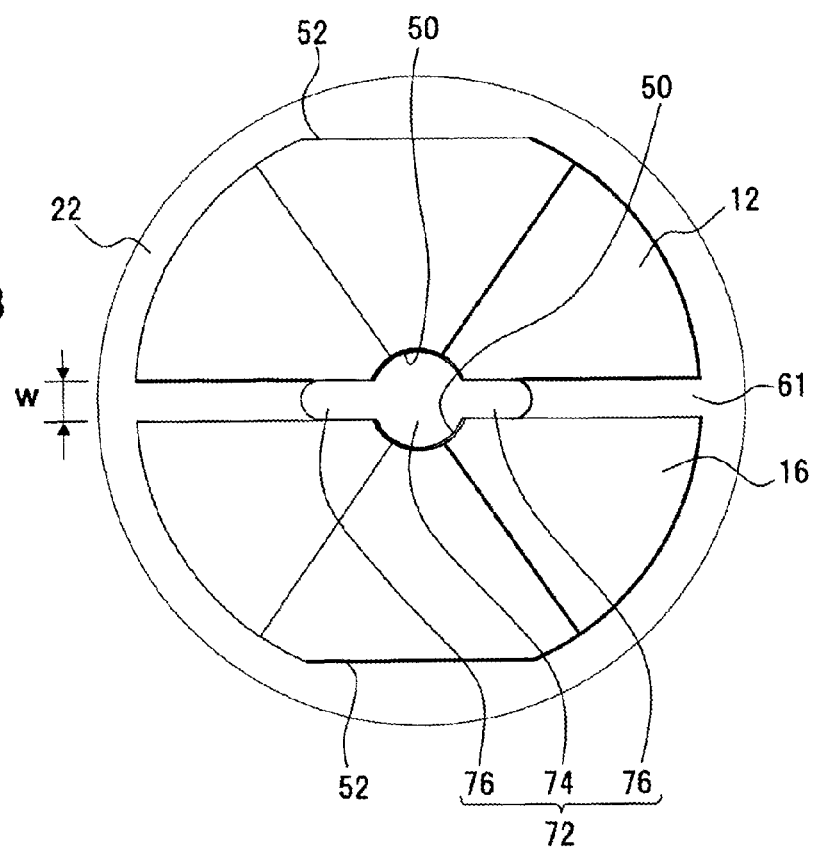

FIGS. 13A and 13B will be referred to concerning the fifth embodiment. FIGS. 13A and 13B depict the sealing plate according to the fifth embodiment. FIG. 13A depicts the sealing plate viewed from the rear. FIG. 13B depicts an anode current collector plate and a cathode current collector plate that are positioned by the sealing plate.

On the rear of the sealing plate 22 of this embodiment, as depicted in FIG. 13A, a positioning protrusion 72 that is made of insulating materials is formed on the space between the anode terminal 10 and the cathode terminal 14. This positioning protrusion 72 is to protrude toward the winding center 46 of the capacitor element 4 (FIG. 1). This positioning protrusion 72 includes a columnar part 74 and a pair of tabular standing wall parts 76. The columnar part 74 is a columnar body that corresponds to the arcs of the arcuate notches 50 of the anode current collector plate 12 and the cathode current collector plate 16. The columnar part 74 provides the tabular standing wall parts 76 therefor. Each tabular standing wall part 76 is provided for the right and left of this columnar part 74 as the center. The tabular standing wall parts 76 keep the space 61 between the anode current collector plate 12 and the cathode current collector plate 16.

If the sealing plate 22 that includes such a positioning protrusion 72 is provided, the anode current collector plate 12 and the cathode current collector plate 16 are positioned over predetermined locations by the positioning protrusion 72, and the space 61 can be kept a predetermined width w. That is, the anode current collector plate 12 and the cathode current collector plate 16 are positioned over predetermined locations by fitting the arcuate notches 50 of the anode current collector plate 12 and the cathode current collector plate 16 around the columnar part 74 of the positioning protrusion 72 and allowing the anode current collector plate 12 and the cathode current collector plate 16 to be in contact with the side faces of the tabular standing wall parts 76. This positioning enables the terminal side connecting face 64 of the anode terminal 110 to coincide with the connecting face 52 of the anode current collector plate 12 and enables the terminal side connecting face 64 of the cathode terminal 14 to coincide with the connecting face 52 of the cathode current collector plate 16, the stabilization of the connection by laser welding is achieved, and the accuracy of the connection can be improved. The positioning protrusion 72 can also surely isolate the anode part 6 from the cathode part 8.

In this embodiment, the positioning protrusion 72 is formed on the sealing plate 22. However, a positioning protrusion may be provided for any one of external terminals (anode terminal 10 and cathode terminal 14) and current collector plates (anode current collector plate 12 and cathode current collector plate 16). Under such a structure, similarly, connection locations for the external terminals and the current collector plates can also be decided by a positioning means, irradiated faces with lasers can be uniformly united, the stability of the connection is achieved, and the connection of high reliability can be realized.

Sixth Embodiment

The sixth embodiment discloses to include connecting plates that are separate from current collector plates.

Figure 14:
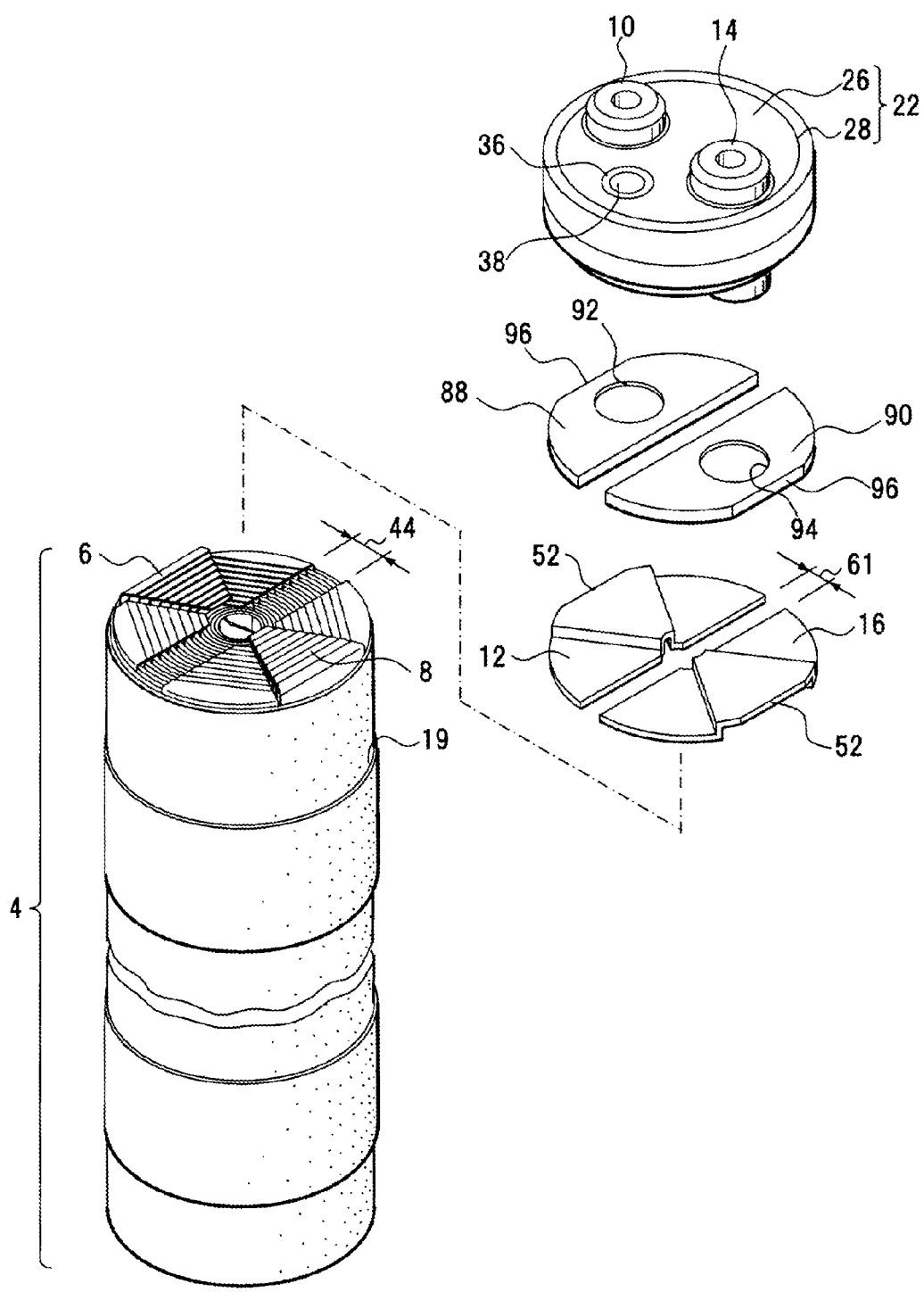
FIG. 14 is an exploded perspective view depicting another embodiment of an electric double layer capacitor that includes terminal connecting plates.

FIG. 14 will be referred to concerning the sixth embodiment. FIG. 14 depicts an electric double layer capacitor according to the sixth embodiment.

As depicted in FIG. 14, in this sixth embodiment, an anode connecting plate 88 as an anode terminal member along with the anode terminal 10 and a cathode connecting plate 90 as a cathode terminal member along with the cathode terminal 14 are provided. The anode connecting plate 88 is connected to the anode current collector plate 12 on the capacitor element 4 after connected to the anode terminal 10 by laser welding. As well, the cathode connecting plate 90 is connected to the cathode current collector plate 16 on the capacitor element 4 after connected to the cathode terminal 14 by laser welding. A depression, for connection 92 that is for positioning and connecting the anode terminal 10 is formed on the anode connecting plate 88, and a depression for connection 94 that is for positioning and connecting the cathode terminal 14 is formed on the cathode connecting plate 90. A connecting face 96 that corresponds to the connecting face 52 of the anode current collector plate 12 or the cathode current collector plate 16 is formed along part of the circumference of the anode connecting plate 88 or cathode connecting plate 90. This connecting face 96 and the connecting face 52 constitute the common plane, and are electrically connected by laser welding.

In the structure using such anode connecting plate 88 and cathode connecting plate 90, the connection between the anode terminal 10, which is an external terminal, and the anode current collector plate 12, which is connected in the capacitor element 4 side, and the connection between the cathode terminal 14, which is an external terminal, and the cathode current collector plate 16, which is connected in the capacitor element 4 side, are performed on large areas. Thereby, the connection resistance can be reduced and even the connection strength can be improved.

Seventh Embodiment

The seventh embodiment discloses welding of current collector plates and terminals.

Figure 15:
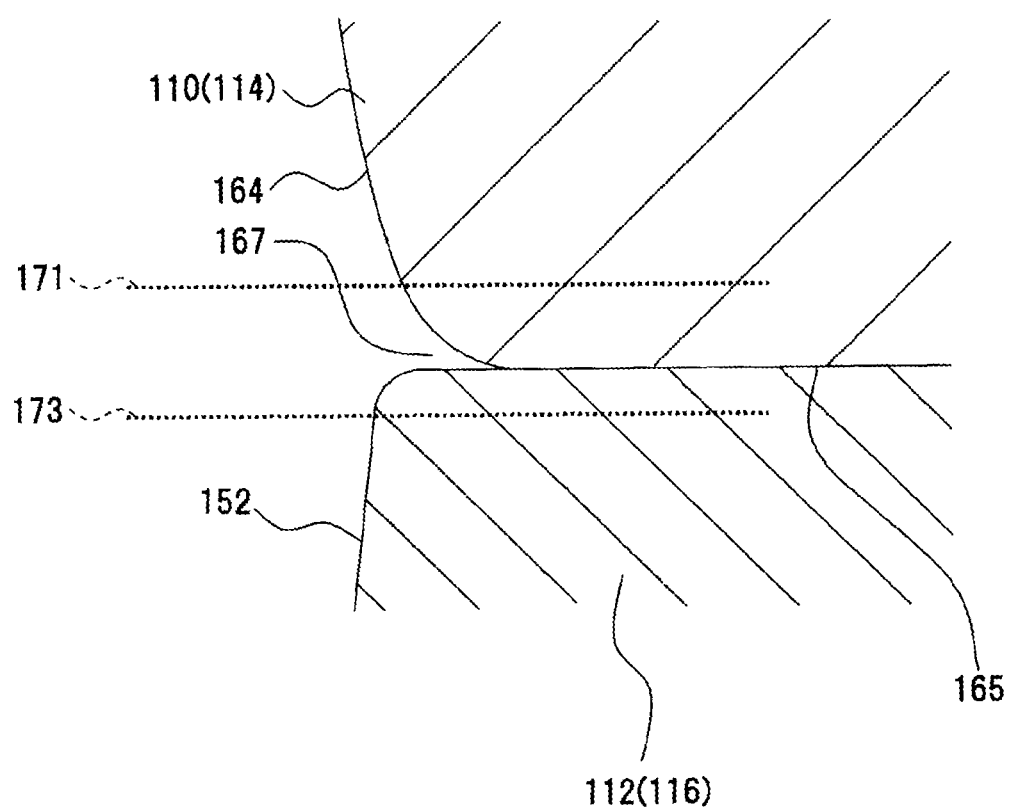
FIG. 15 depicts an enlarged welded portion of an anode current collector plate and an anode terminal.

FIG. 15 will be referred to concerning welding of an anode current collector plate 112 and an anode terminal 110 (or a cathode current collector plate 116 and a cathode terminal 114) according to the seventh embodiment. FIG. 15 depicts an enlarged welded portion of the anode current collector plate 112 and the anode terminal 110.

For example, the anode current collector plate 112 is made by a heading process on a plate of aluminum. A connecting face 152 of the anode current collector plate 112 constitutes a slope between the top and bottom faces of the anode current collector plate 112. As an example, the connecting face 152 is a slope that slopes clockwise based on the vertical plane. The edge of the connecting face 152 in the contact face 165 side is a curve. The anode terminal 110 is also made by a heading process on a plate of aluminum, for example. A terminal side connecting face 164 of the anode terminal 110 constitutes a slope toward the anode current collector plate 112. The terminal side connecting face 164 as an example is a slope that slopes counterclockwise based on the vertical plane. The edge of the terminal side connecting face 164 in the contact face 165 side is a curve as well as that of the anode current collector plate 112. Therefore, a portion where the faces adhere to each other, and a non-contact portion 167 where the faces curve upward and downward respectively, to be spread are provided for the contact faces 165 side. Such a form of the anode current collector plate 112 and the anode terminal 110 applies to the cathode current collector plate 116 and the cathode terminal 114 as well.

Center positions (irradiated positions 171 and 173) irradiated with a laser beam 169 that are other than such contact faces 165 of the anode current collector plate 112 and the anode terminal 110 are set. The irradiated position 171 shifts upward above the contact faces 165 in the drawing. The irradiated position 173 is shifts downward below the contact faces 165 in the drawing. These irradiated positions 171 and 173 may be in locations other than the contact faces 165, and may be in such locations that the contact faces 165 can be included within a nugget 118 (FIGS. 17A and 17B) formed by the laser beam 169.

Figure 16A:
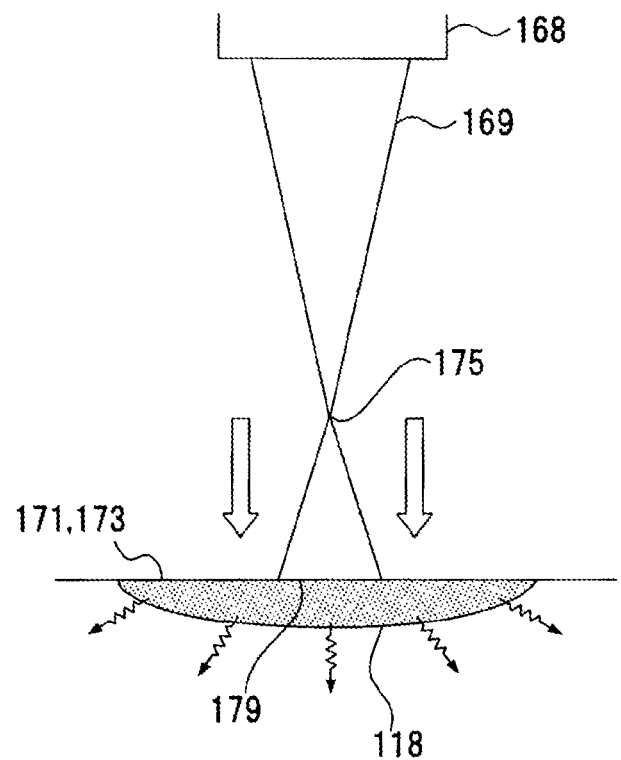
FIGS. 16A and 16B depict welding forms by laser beams.
Figure 16B:
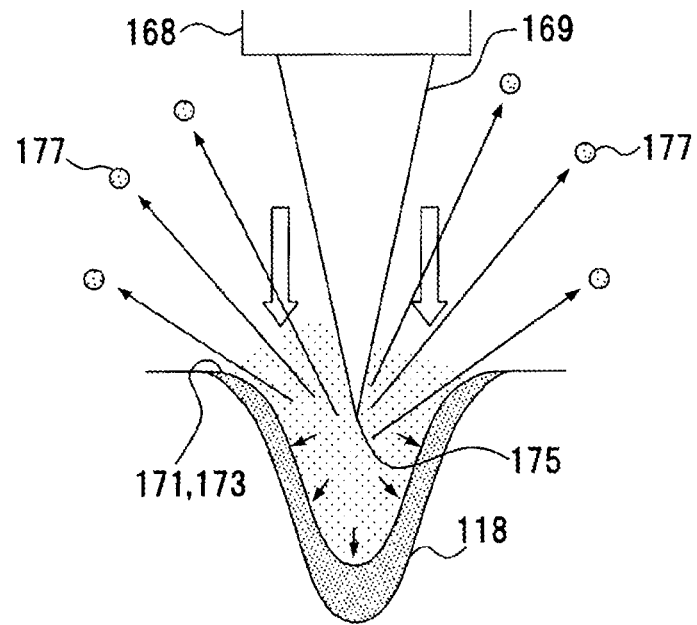

FIGS. 16A and 16B will be referred to concerning welding forms of this laser beam 169. Welding forms of the laser beam 169 include thermal conduction welding as depicted in FIG. 16A, and key hole welding as depicted in FIG. 16B. While any type of welding forms may be used for metal welding, key hole welding produces the nugget 118, which is sharp, long and large, because a focus 175 of the laser beam 169 that is sharp is applied to a welded face. There may be a case that spatters 177 are numerously formed according to the growth of the nugget 118.

On the contrary, thermal conduction welding uses defocus where the focus 175 is in front of the irradiated positions 171 and 173 of the laser beam 169. An irradiated part 179 that is long in diameter is formed on the irradiated positions 171 and 173. Thermal conduction occurs more gradually to this irradiated part 179 than using the focus 175 that is sharp, and then, the nugget 118, which is gentle, is formed. That is, thermal conduction welding generates the nugget 118, which spreads in the direction of the radius of the irradiated part 179. In this welding process, the nugget diameter is lengthened by defocus of the laser beam 169. Key hole welding is shifted to thermal conduction welding.

Figure 17A:
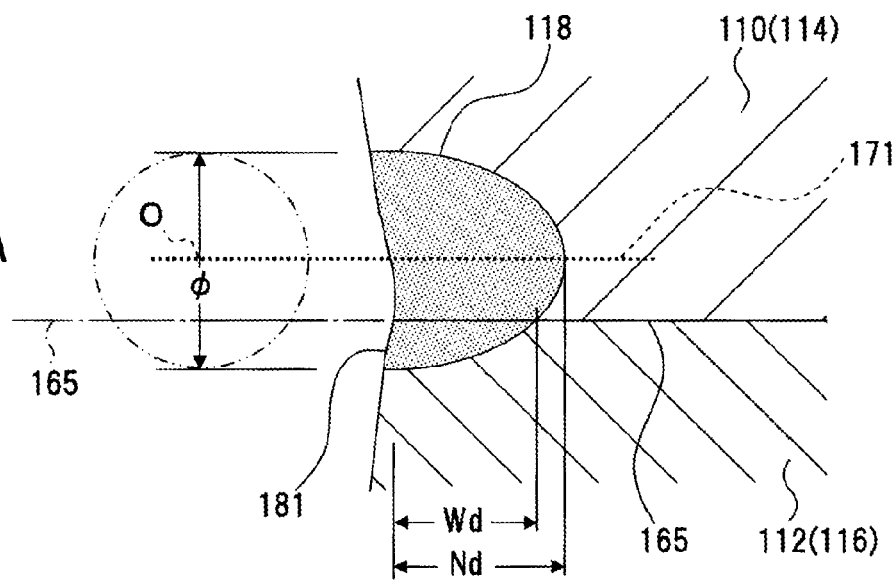
FIGS. 17A and 17B depict a nugget, which is formed by thermal conduction welding.
Figure 17B:
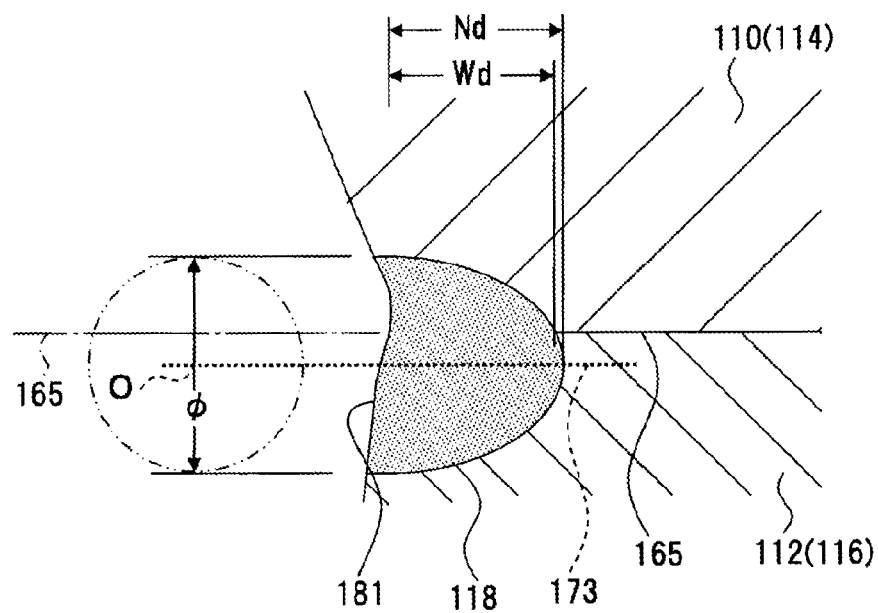

Concerning the above described irradiated positions 171 and 173 and welding energy, each irradiated position 171 and 173 indicates the center position of the laser beam 169. The range irradiated with the laser beam 169 is the same as the diameter of the nugget 118 (FIGS. 17A and 17B). Thus, if this center position is moved (that is, an irradiated position is not the non-contact portion 167 but at a flat plane), welding energy at the center position which the maximum energy of the laser beam 169 can be efficiently given to welded portions without decreasing. Therefore, the desired nugget depth (welded range) can be obtained.

FIGS. 17A and 17B will be referred to concerning the nugget 118 that is formed by such thermal conduction welding. In FIG. 17A, the center position of irradiation with the laser beam 169 is set for the irradiated position 171 and the irradiation is performed. Defocus in this irradiation form lengthens the nugget diameter. In FIG. 17B, the center position of irradiation with the laser beam 169 is set for the irradiated position 173 and the irradiation is performed. Defocus in this irradiation form lengthens the nugget diameter. That is, in FIG. 17A, a nugget center O is set upper than the contact faces 165 in the drawing, and in FIG. 17B, the nugget center O is set lower than the contact faces 165 in the drawing.

In such thermal conduction welding, even if the irradiated position 171 or 173 shifts above or below the contact faces 165, the contact faces 165 are taken in to the nugget 118 whose diameter is lengthened, and the anode current collector plate 112 and the anode terminal 110 are welded. In FIGS. 17A and 1713, φ is a nugget diameter, Nd is a nugget depth, and Wd is a welding depth. The welding depth Wd (≈Nd), which is equal to the nugget depth Nd, can be obtained because the nugget diameter ϕ is long and the nugget 118 is flatter than that in the case of keyhole welding. Thereby, the accuracy and strength of welding can be improved. Desired strength of welding can be obtained by setting the difference in measure between the nugget depth Nd and the welding depth Wd within 05 mm.

On the outer surface of the nugget 118, a face part 181 that is gradual is generated by unity through welding of portions which adhere to each other in the contact faces 165 side, and the non-contact portion 167 where the faces curve and respectively spread upward and downward before welding.

The nugget 118 is consecutively or nonconsecutively formed parallel to the contact faces 165 of the anode current collector plate 112 and the anode terminal 110, or to the contact faces 165 of the cathode current collector plate 116 and the cathode terminal 114 (along the connecting face 152 and the terminal side connecting face 164, and in parallel).

In this embodiment, the irradiated positions 171 and 173 with the laser beam 169 or electron beams are moved orthogonally to the contact faces 165. The irradiated positions 171 and 173 may be moved in the crossing direction to the contact faces 165.

The following effects can be obtained according to this seventh embodiment.

(1) In the above embodiment, the laser beam 169 is used. Electron beams may be used instead of the laser beam 169. In this embodiment, positions that are other than the contact faces 165 of the anode current collector plate 112 and an external terminal member, or positions that are other than the contact faces 165 of the cathode current collector plate 116 and an external terminal member are irradiated with the laser beam 169 or electron beams. Thus, current collector plates and external terminal members can be welded whatever the state of the contact faces thereof is.

(2) Any of the irradiated position 171 in the external terminal side and the irradiated position 173 in the anode current collector plate 112 (or the cathode current collector plate 116) side may be selected for the laser beam 169. Any of their flat faces can be selected and irradiated with laser beams or electron beams. In such irradiation form with the laser beam 169 or electron beams, the optimal welded range can be obtained even if the accuracy of processing of the contact faces of the anode current collector plate 112 (or the cathode current collector plate 116) and an external terminal member is low and even if there are gaps. The accuracy of welding and the welding strength of current collector plates and external terminal members can improved as well (3) Comparatively soft metal materials such as aluminum are used for the anode current collector plate 112 (or the cathode current collector plate 116) and external terminal members. Thus, the accuracy of the processing has its limit when a heading process or the like is performed on such materials. Gaps cannot be avoided from being generated between the contact faces of the anode current collector plate 112 (or the cathode current collector plate 116) and an external terminal member. In such a case, the accuracy of welding can be improved by shifting the above described irradiated positions 171 and 173 with laser beams or electron beams from the contact faces 165.

(4) The irradiated positions 171 and 173 with the laser beam 169 or electron beams may be different from location of the contact faces 165 in a crossing direction to the contact faces 165. It is preferable that the amount and range of this difference is within the range of ±0.1 to ±0.5 mm, for example. If this range is set, the welded range with the laser beam 169 or electron beams can include the contact faces 165.

The depth of the nugget 118 from laser welding or electron beam welding may be a depth so that welding can be performed. For example, 1.2 mm or less is preferable. If this range is set, the irradiated range with the laser beam 169 or electron beams can be made to be proper, the measures of current collector plates and external terminal members in thickness is not increased, and capacitors can be avoided from being large.

Eighth Embodiment

The eighth embodiment discloses welding of current collector plates and terminals.

Figure 18:
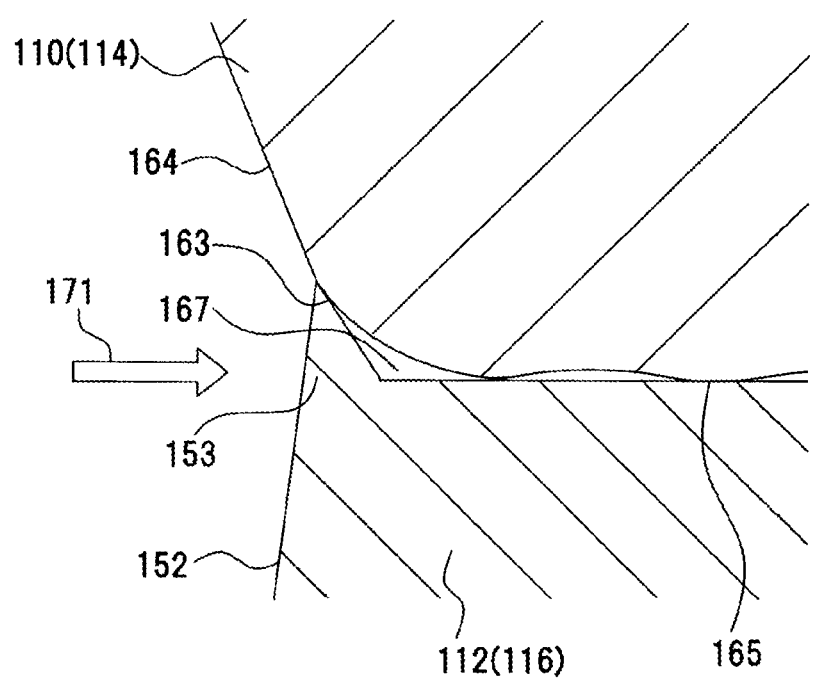
FIG. 18 depicts an enlarged welded portion of the anode current collector plate and the anode terminal.

FIG. 18 will be referred to concerning welding of the anode current collector plate 112 and the anode terminal 110 (or the cathode current collector plate 116 and the cathode terminal 114) according to the eighth embodiment. FIG. 18 depicts an enlarged welded portion of the anode current collector plate 112 and the anode terminal 110.

For example, the anode current collector plate 112 is made by a heading process on a plate of aluminum. A cover 153 that has a triangular cross-section is formed on the connecting face 152 as an example. The anode terminal 110 is also made by a heading process on a plate of aluminum, and a taper face 163 is formed thereon, for example. If the angle of this taper face 163 is made to coincide with an angle of inclination of an inside wall face of the cover 153, the taper face 163 and the cover 153 can be matched with each other. In this case, gaps or the like appear between the contacting faces 165 according to the accuracy of processing. In short, portions where the faces adhere to each other, and the non-contact portion 167 where the faces curve upward and downward respectively, to be spread are provided for the contact faces 165 side. Such a form of the anode current collector plate 112 and the anode terminal 110 applies to the cathode current collector plate 116 and the cathode terminal 114 as well.

A center position (irradiated position 171) irradiated with the laser beam 169 that coincides with such contact faces 165 of the anode current collector plate 112 and the anode terminal 110 is set. The irradiated position 171 may coincide with the contact faces 165 in the drawing, or may be a position other than the contact faces 165.

Welding forms by this laser beam 169 are as described in the seventh embodiment. Thus, the description is omitted.

Figure 19:
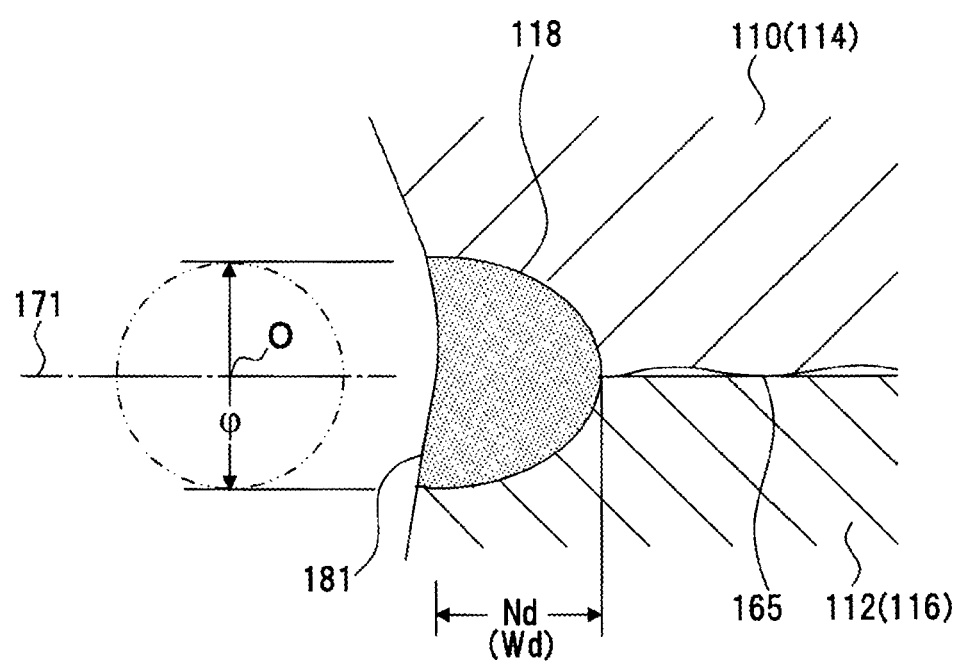
FIG. 19 depicts the nugget, which is formed by thermal conduction welding.

FIG. 19 will be referred to concerning the nugget 118 that is formed by the thermal conduction welding. In FIG. 19, the irradiated position 171 is irradiated with the laser beam 169, and defocus in this irradiation, form n lengthens the nugget diameter. That is, in FIG. 19, the nugget center O is set so as to coincide with the contact faces 165. The nugget center O may be set upward or downward in the drawing (different from the contact faces 165 in a crossing direction of the contact faces 165).

In such thermal conduction welding, the contact faces 165 are taken in to the nugget 118 whose diameter is lengthened because the irradiated position 171 coincides with the contact faces 165, and the anode current collector plate 112 and the anode terminal 110 are welded. In FIG. 19, ϕ is a nugget diameter, Nd is a nugget depth, and Wd is a welding depth. The welding depth Wd (≈Nd), which is equal to the nugget depth Nd, can be obtained because the nugget diameter ϕ is long and the nugget 118 is flatter than that in the case of keyhole welding. Thereby, the accuracy and strength of welding can be improved.

On the outer surface of the nugget 118, the face part 181 that is gradual is generated by unity through welding of a portion which adheres to the cover 153 in the contact faces 165 side, and the non-contact portion 167 where the faces curve and respectively spread upward and downward before welding.

Figure 20A:
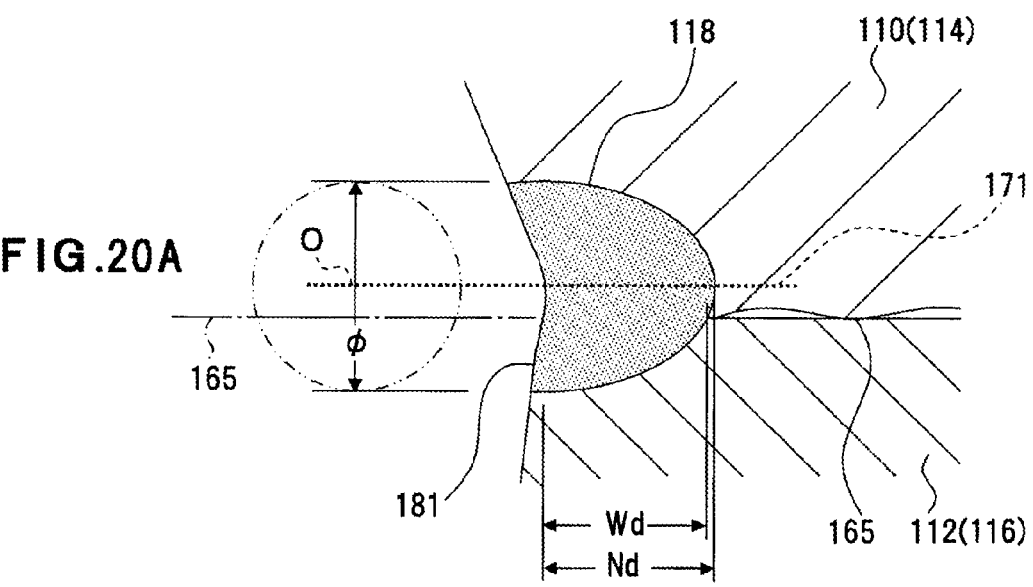
FIGS. 20A and 20B depict another type of the nugget, which is formed by thermal conduction welding.
Figure 20B:
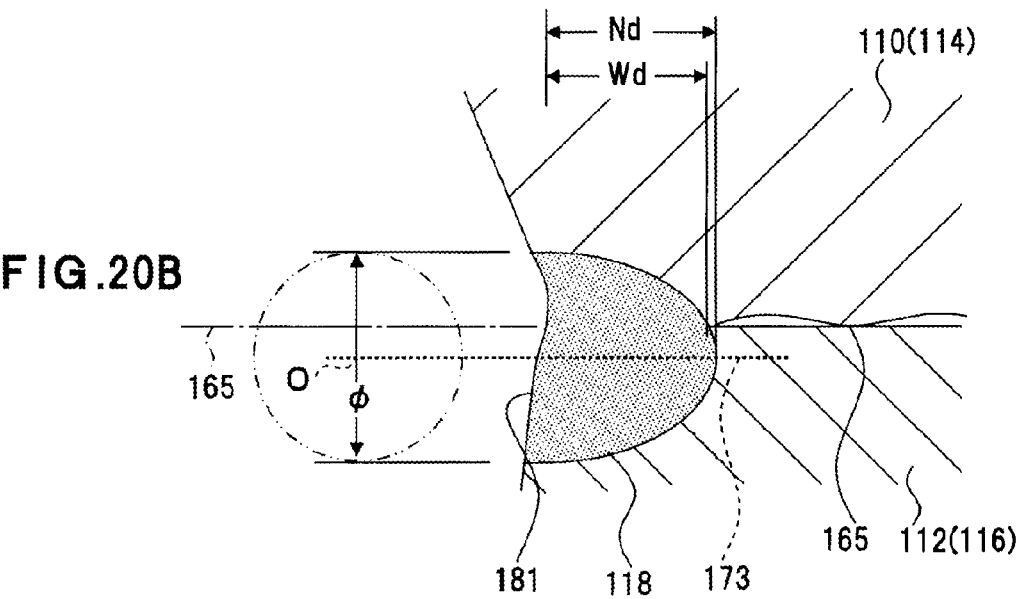

The irradiated position 171 of the laser beam 169 may vary above the contact faces 165 as depicted in FIG. 20A, or below the contact faces 165 as depicted in FIG. 20B within the range of the side face of the cover 135 or the side face of a current collector plate where the cover 153 is provided. In this case, the contact faces 165 are taken in to the nugget 118 whose diameter is lengthened, and the anode current collector plate 112 and the anode terminal 110 are welded as well. In FIGS. 20A and 20B, $\phi$ is a nugget diameter, Nd is a nugget depth, and Wd is a welding depth. The welding depth Wd ($\approx$Nd), which is equal to the nugget depth Nd, can be obtained because the nugget diameter $\phi$ is long and the nugget 118 is flatter than that in the case of keyhole welding. Thereby, the accuracy and strength of welding can be improved. Desired strength of welding can be obtained by setting the difference in measure between the nugget depth Nd and the welding depth Wd within 05 mm.

The nugget 118 is consecutively or nonconsecutively formed parallel to the contact faces 165 of the anode current collector plate 112 and the anode terminal 110, or to the contact faces 165 of the cathode current collector plate 116 and the cathode terminal 114 (along the connecting face 152 and the terminal side connecting face 164, and in parallel).

According to this eighth embodiment, the same effects as described in the seventh embodiment can be obtained.

Ninth Embodiment

The ninth embodiment discloses control of laser irradiating power for weld lines. As described above, the method for manufacturing capacitors includes the steps of forming the anode part 6 and the cathode part 8 on, the element end-face 5 of the capacitor element 4, and respectively welding to connect the anode current collector plate 12 and the cathode current collector plate 16, to the anode part 6 and the cathode part 8. In this connecting step, weld lines extending from welding start points to welding end points are set on current collector plates, and power of beams with which these weld lines are irradiated is sequentially varied step by step to perform beam irradiation.

Figure 21A:
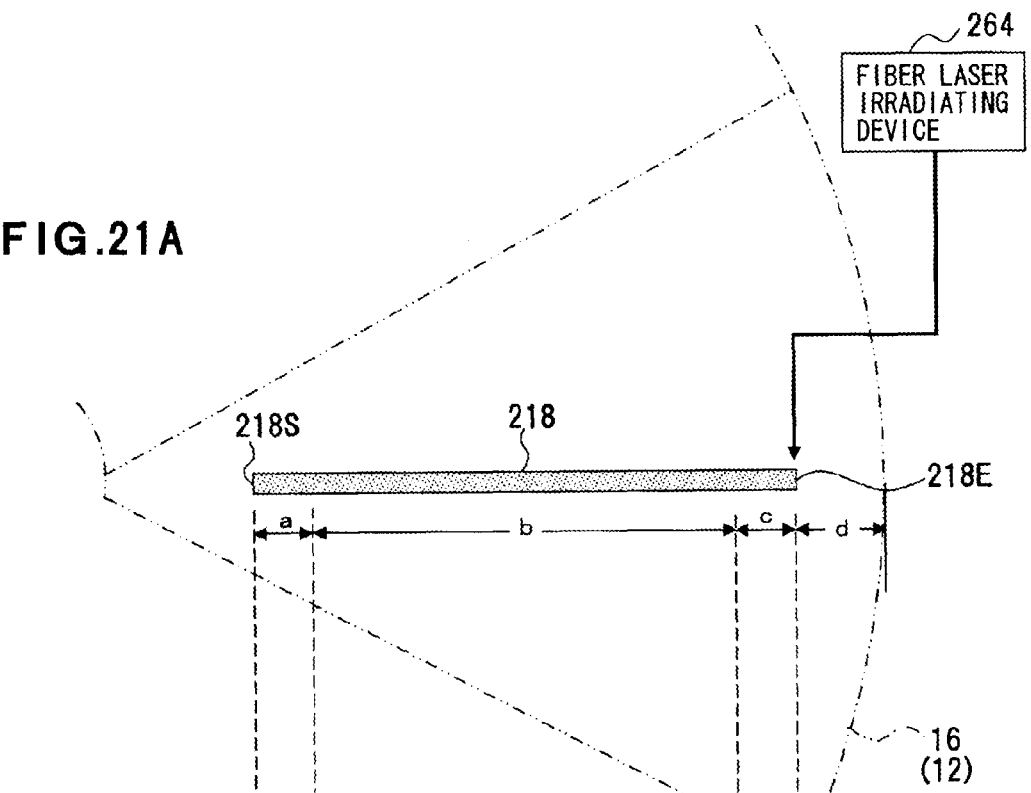
FIGS. 21A and 21B depict a weld line, laser power and an output power waveform.
Figure 21B:
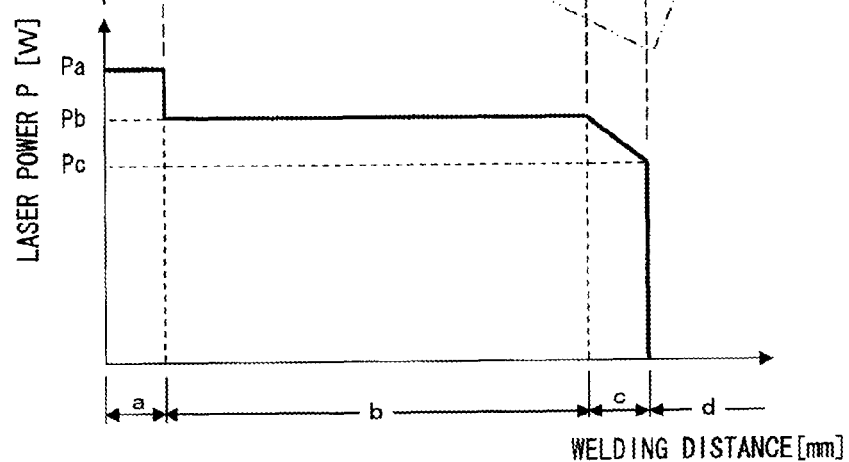

FIGS. 21A and 21B depict a weld line and laser power according to the ninth embodiment.

FIGS. 21A and 21B will be referred to concerning this welding by laser irradiation. FIG. 21A of depicts a weld line 218 on the anode current collector plate 12 or the cathode current collector plate 16. Segments a, b and c are set between a welding start point 218S and welding end point 218E of this weld line 218. A segment d is set beyond the welding end point 218E.

A fiber laser irradiating device 264 as an example of beam irradiating means is used for this laser welding. The weld line 218 is a portion welded by laser irradiation. In this case, shielding gases such as an argon gas and a helium gas are used to carry out a welding process.

In this laser irradiation by the fiber laser irradiating device 264, beam power for the weld line 218 is sequentially varied step by step at the constant irradiating speed. In this embodiment, as depicted in FIG. 21B, a constant value of laser power Pa is set for laser power P in the segment a, and a constant value of laser power Pb (<Pa) is set for laser power P in the segment b. In the segment c, the laser power Pb is attenuated to laser power Pc (<Pb). The largest value is set for the laser power Pa in the segment a, which is, for example, in the range of 50 W to 3,000 W. The laser power Pb in the segment b is weaker than the laser power Pa, and is not more than 90% of the laser power Pa. The laser power Pc in the segment c is a smaller value than the laser power Pb, and is not more than 80% of the laser power Pa. In this case, a horizontal axis represents distance (mm) in FIG. 21B.

The largest value is set for the power Pa of lasers with which the welding start point 218S is irradiated. Shorter irradiating time than the segment b is set for the segment a, which is irradiated with lasers of the power Pa. Following the segment a, the segment b, which is irradiated with lasers of the power Pb, is set longest. Shorter time than the segment b is set for the segment c. In this segment c, the laser power Pb is linearly attenuated to the laser power Pc. Like the above, it is preferable to attenuate laser power near the welding start point 218S and the welding end point 218E. That is, it is preferable that there is more than one segment where laser power is attenuated.

The speed of laser scanning for the weld line 218 is the constant speed. For example, the speed may be the constant speed that is selected from the range of 300 mm/s to 3,000 mm/s. The scanning speed may be changed according to a segment.

As to weld lines, a plurality of weld lines may be set adjacent to each portion to be welded to the anode part 6 in the anode current collector plate 12 and that to the cathode part 8 in the cathode current collector plate 16, to realize multiple welding.

The following effects can be obtained according to this ninth embodiment.

(1) Laser power for the weld line 218 that extends from the start point 218S to the end point 218E of laser welding for the anode current collector plate 12 or the cathode current collector plate 16, and the anode part 6 or the cathode part 8 of the capacitor element 4 is attenuated sequentially step by step. Thereby, welding energy applied to a current collector plate and an electrode protrusion can be equalized, and the connectivity can be improved.

(2) At the start point 218S of laser irradiation, laser power is set high, and the laser irradiation is carried out with this high laser power. The weld line 218 on the anode current collector plate 12 and the anode part 6, or on the cathode current collector plate 16 and the cathode part 8 for which laser irradiation is carried, out, and the vicinity thereof are heated. That is, if laser irradiation is done along the weld line 218, heated points move successively as lasers scan the points for irradiation, to bring a melting state successively without setting equalized laser power. Therefore, thermal energy that is brought by laser irradiation and is applied to welded parts is equalized although laser power is attenuated sequentially step by step (the above embodiment), or step by step or sequentially. Thus, the connectivity of the anode current collector plate 12 and the anode part 6, or that of the cathode current collector plate 16 and the cathode part 8 is improved.

(3) If laser power is kept a certain level, there appear points where thermal energy is excessive. The fact that electrodes forming electrode protrusions are thin results in excessive concentration of thermal energy, to bring uneven melting, and the connectivity of current collector plates and electrode protrusions becomes unstable. Such inconvenience can be avoided by attenuation of laser power.

Tenth Embodiment

A tenth embodiment discloses control of irradiating angles of laser welding.

Figure 22:
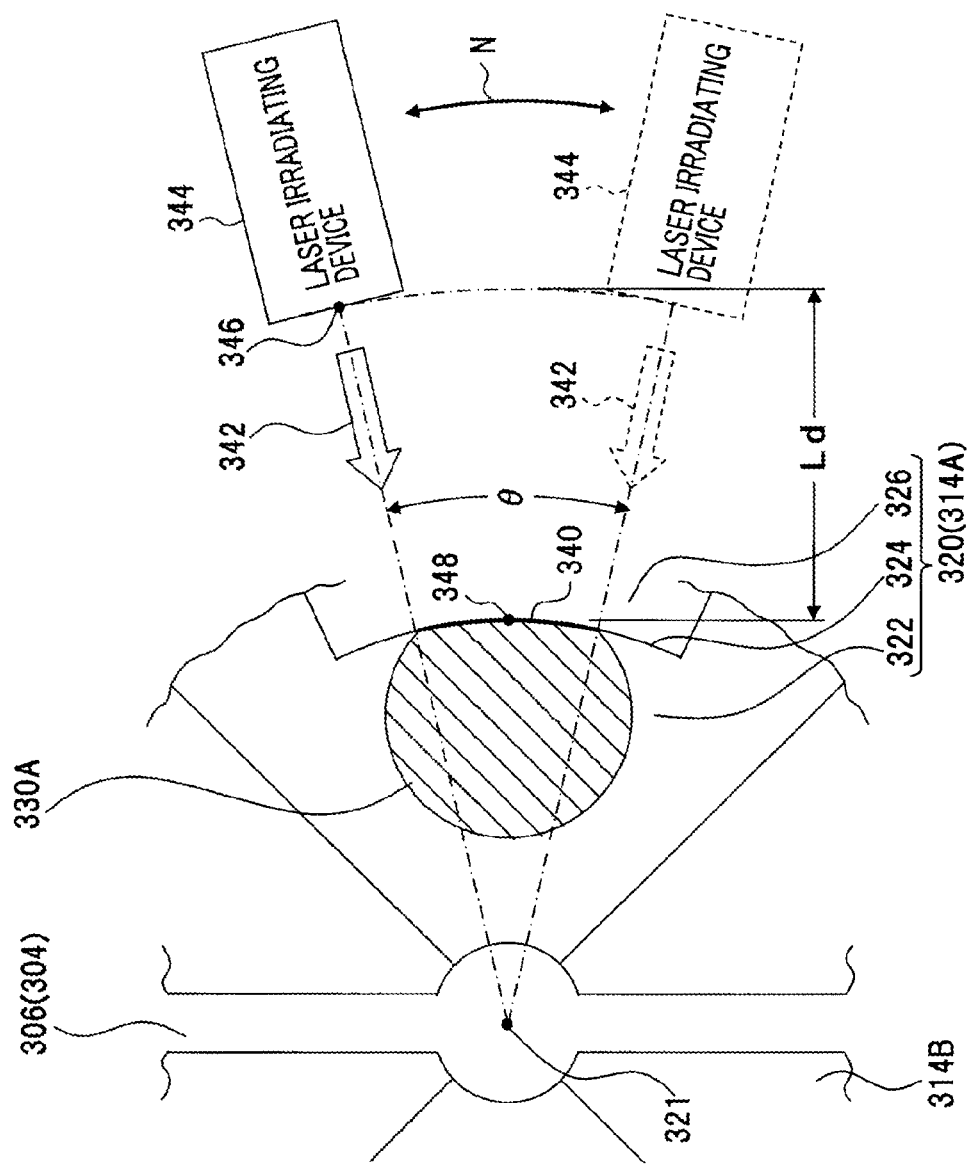
FIG. 22 depicts an example of laser irradiation for current collector plates and external terminals according to the tenth embodiment.

FIG. 22 depicts an example of a laser irradiating angle and welded faces according to the tenth embodiment.

Current collector plates 314A and 314B are placed on the basis of an element center 321 of an element end-face 306 of a capacitor element 304, and are connected to an anode part 308 or a cathode part 310 of the capacitor element 304. A connecting face 324 of a terminal welding part 320 of each current collector plate 314A and 314B constitutes an arcuate face based on the element center 321.

On the contrary, as depicted in FIG. 22, a connecting face 340 of an anode terminal 330A or a cathode terminal 330B, which is placed on a terminal placing face 322, is made to coincide with the connecting face 324. A laser irradiating device 344 is placed, so that a laser emission part 346 thereof faces toward the connecting faces 324 and 340.

If distance between the laser emission part 346 and a laser irradiated point 348 of the connecting faces 324 and 340 is Ld, the distance Ld can be kept even if the laser irradiating device 344 is rotated in the direction of an arrow N, around the element center 321 as the rotation center. If a rotation angle θ that is assumed to be a rotation angle of the laser irradiating device 344 is set for a welded range while the laser irradiated point 348 is at the middle of the rotation angle θ, laser irradiation 342 for the constant distance Ld can be operated uniformly on the connecting faces 324 and 340, to be able to perform welding. The distance Ld for the laser irradiation 342 is constant, the laser irradiation 342 can be stably and sequentially performed, a uniformly welding process can be performed, and the reliability of the connection can be improved. In this structure, the capacitor element 304 may be rotated around the element center 321 as the rotation center to perform welding instead of the rotational movement of the laser irradiating device 344.

As an example of this terminal connecting step, the laser irradiation 342 is performed while the laser irradiating device 344 is rotated around the element center 321 of the capacitor element 304 by predetermined angle θ. Then, the anode terminal 330A and the current collector plate 314A are welded. The capacitor element 304 is reversed (half-turned) then, and is directed toward the laser emission part 346, to arrange the connecting faces 324 and 340 of the cathode terminal 330B and the current collector plate 314B, which face to the laser irradiating device 344. In this situation, the laser irradiating device 344 is directed to the element center 321 and is rotated by the above described predetermined angle θ, and the laser irradiation 342 is performed to carry out welding.

Figure 23:
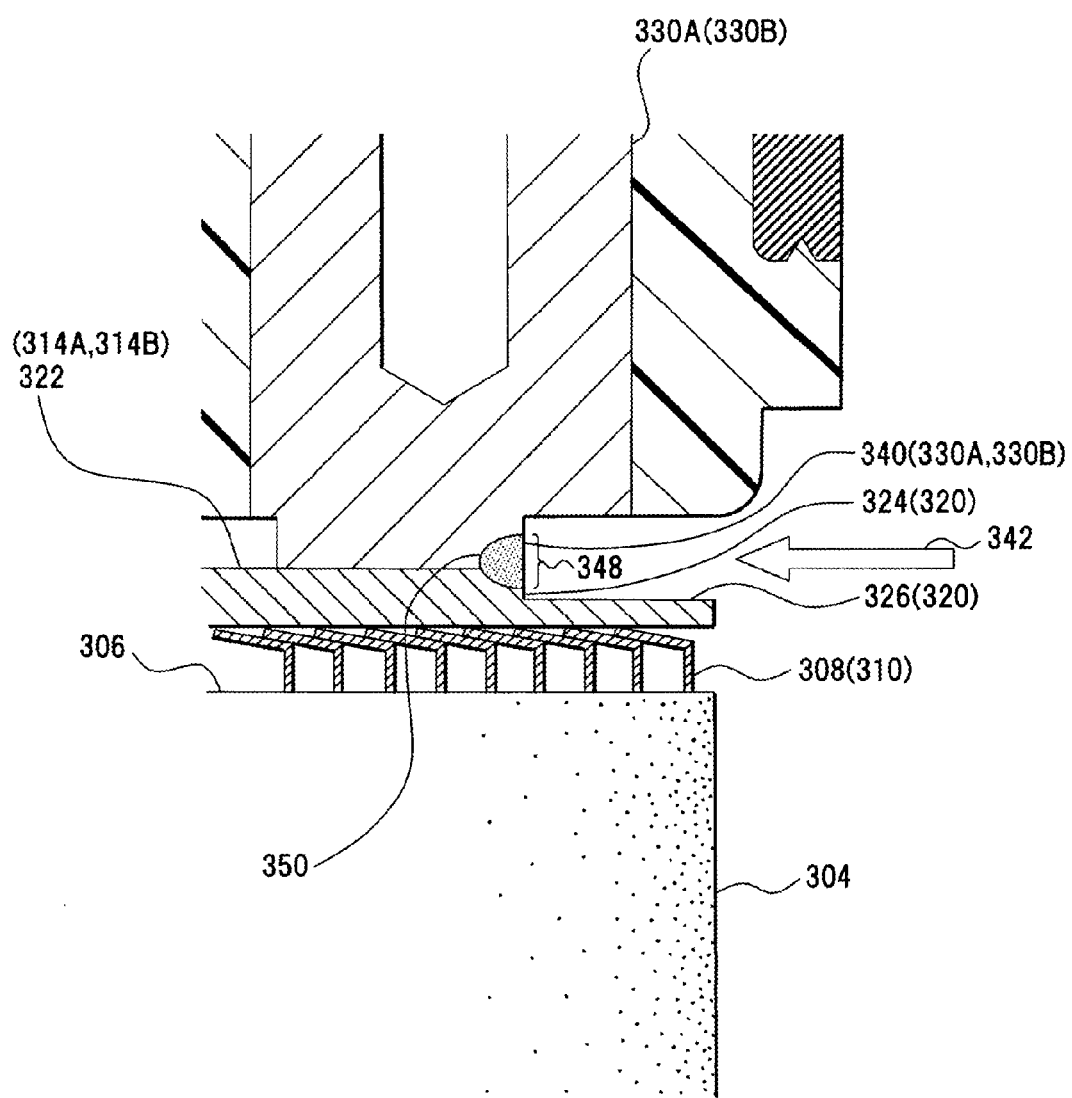
FIG. 23 depicts an example of welding the current collector plates and the external terminals.

As to this laser welding process, as depicted in FIG. 23, the connecting faces 324 and 340 are uniformly welded, and the anode terminal 330A (cathode terminal 330B) and the current collector plate 314A (314B) are connected by a welded part 350. In this welding, the laser irradiation 342 is performed on the laser irradiated point 348. This laser irradiation 342 is carried out in the atmosphere of inert gases such as an argon gas.

The anode part 308 (cathode part 310) and the capacitor element 304 can be protected from flying objects generated from the laser irradiation 342 and laser welding because an element cover 326 that each current collector plate 314A and 3141 provides therfor covers the anode part 308 (cathode part 310) in the capacitor element 304 side.

The following effects can be obtained according to this tenth embodiment.

(1) Each second connecting face 340 that matches the first connecting face 324 of each current collector plate, which is connected to a capacitor element, is provided for a terminal member, and these first and second connecting faces are welded. Thus, the connection of current collector plates and terminal members can be facilitated, and the reliability of the connection can be improved.

(2) The accuracy of laser welding or electron beam welding can be improved.

(3) The welding step can be simplified, and the expedition of the connecting process can be achieved.

Other Embodiments (1) In the above embodiments, a wound element is exemplified as a capacitor element. However, elements are not limited to wound elements. Laminated elements or solid-state elements may be used.

(2) The above embodiments disclose the structure of providing the anode part 6 and the cathode part 8 for one of the element end-faces (same face) of a capacitor element, to connect the anode part 6 and the cathode part 8, to external terminals. An anode part may be provided for one element end-face, and a cathode part may be provided for the other element end-face.

(3) In the above embodiments, the electric double layer capacitor 2 is exemplified. However, the present invention is not limited to this. The same structure and method can be applied to electrolytic capacitors as well, and the same effects can be obtained.

(4) In the above embodiments, the anode current collector plate 12 and the cathode current collector plate 16 are illustrated as current collector plates. However, the present invention is not limited to the above embodiments. The connecting face 52 is described as flat. However, the connecting face 52 may be a shape that matches a shape of an external terminal, that is, a curve. A position of this connecting face 52 may be within the surface or circumference face of a current collector plate. Protrusions for the connection may be provided.

(5) In the above embodiments, an isolation distance is placed between an anode part and a cathode part. Insulating members may be placed in this isolation distance.

(6) in the above embodiments, laser welding and electron beam welding are exemplified as welding means. This invention is not limited to them. Arc welding etc. may be used. In this case, the connecting face 52 is formed on the outer circumferential face of a current collector plate, which is like a protrusion, and arc welding may be performed on the connecting face 52 and the terminal side connecting face 64.

(7) In the above embodiments, the anode part 6 and the cathode part 8 are formed like a semi-circular shape. The present invention is not limited to this. Only the sections 6B, 6C, 8B and 8C from the sections 6A, 6B and 6C of the anode part 6 and the sections 8A, 8B and 8C of the cathode part 8 that are presented in the embodiments and that are to be connected to the anode current collector plate 12 and the cathode current collector plate 16 are made to protrude to be formed. The section 6A of the anode part 6 and the section 8A of the cathode part 8 may not protrude.

(8) In the above embodiments, the element connecting parts 56B and 56C, or 58B and 58C that are element connecting areas with the anode part 6 and the cathode part 8, and the terminal connecting part 56A or 58A that is a terminal connecting area are respectively set on both sides of a current collector plate based on sections that are three divisions as different positions on the current collector plate, and are set on horizontally different positions. The present invention is not limited to this. Element connecting areas (laser irradiated connecting parts 66) may be set on part of a current collector plate, and a terminal connecting area (welded connecting part 18) may be set on any other part.

That is, as long as welded positions are different in both sides of a current collector plate, element connecting areas and a terminal connecting area may be close to each other. In short, the welded connecting part 18 may be set on a portion on the element connecting part 56B, which is an element connecting area where welded positions of the welded connecting part 18 and the laser irradiated connecting part 66 on both faces of a current collector plate are not superposed on each other.

(9) In the capacitor or the method for manufacturing the capacitor of the present invention, the irradiated position that is irradiated with laser beams or electron beams may be made to coincide with the contact faces of a current collector plate and a terminal member, or may be differentiated from a location of the contact faces in a direction crossing the contact faces.

(10) In the method for manufacturing the capacitor of the present invention, a first connecting face and a second connecting face may be formed so as to be concentric based on the element center of the capacitor element, and the capacitor element or a welding means may be rotationally moved around the element center as a rotation center.

According to the capacitor or the method for manufacturing the capacitor disclosed in "DETAILED DESCRIPTION OF THE INVENTION", any of the following effects can be obtained.

(1) Each current collector plate, which is connected to a single or a plurality of electrode protrusion(s) drawn to an element end-face from one or both of an electrode body(ies) of the anode side and the cathode side of a capacitor element, and a terminal member in an outer packaging member are superposed, and the side face parts are connected by welding. Thus, a space for the connection can be narrowed, and moreover, the connection can be strengthened, the reliability of the connection can be improved, the resistance of the capacitor element can be reduced, and ESR (Equivalent Series Resistance) can be reduced.

(2) Each current collector plate is connected to electrode protrusions that are made to protrude from one or different end face(s) of a capacitor element, and electrode bodies of the anode side are connected to each other by a current collector plate, or electrode bodies of the cathode side are connected to each other by a current collector plate. Thus, resistance of the capacitor element can be reduced.

(3) The connection structure is to interpose current collector plates between electrode protrusions that are made to protrude from electrode bodies of a capacitor element, and terminal members in a sealing member. Thus, the simple connection and robust connection structure can be achieved.

(4) According to the above structure, the connection between electrode protrusions and terminal members are facilitated by interposing current collector plates, the connection steps can be simplified, and the connection process can be completed in a short period. Thus, the production costs can be reduced.

(5) A positioning means is provided for any one of a sealing member, external terminals and current collector plates. Thus, connection locations for the external terminals and the current collector plates can be decided by the positioning means, and irradiated faces with lasers can be uniformly united, the connection is stabilized, and the connection of high reliability can be realized.

(6) Positions other than contact faces of current collector plates and terminal members are irradiated with laser beams or electron beams. Thus, the current collector plates and the terminal members can be welded whatever the state of the contact faces thereof is.

(7) Flat faces of current collector plates of terminal members, or of current collector plates that cover contact faces of the current collector plates and terminal members can be selected and irradiated with laser beams or electron beams. Thus, the optimal welded ranges can be obtained even if the accuracy of processing of contact faces of current collector plates and terminal members is low and even if there are gaps, and the accuracy of welding and the welding strength of the current collector plates and the terminal members can be improved.

(8) Contact faces of current collector plates and terminal members are covered by covers that are on the current collector plates or the terminal members, and the covers are irradiated with laser beams or electron beams. Thus, the current collector plates and the terminal members can be welded whatever the state of the contact faces is.

(9) Current collector plates are superposed on electrode protrusions, and weld lines that extend toward the circumference of a capacitor element are set on these current collector plates to be welded. Thus, time for welding for connection between electrode protrusions and current collector plates can be shortened, and the manufacturing steps can be simplified.

(10) Beam power for weld lines that extend from start points to end points for beam welding of current collector plates and electrode protrusions of a capacitor element is attenuated step by step or sequentially. Thus, welding energy applied to current collector plates and electrode protrusions can be equalized, the connectivity can be improved, and the stable welding connection can be realized.

(11) Second connecting faces that match first connecting faces of current collector plates, which are connected to a capacitor element, are provided for terminal members, and these first and second connecting faces are welded. Thus, connection between current collector plates and terminal members can be facilitated, and the reliability of the connection can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The capacitor and the method for manufacturing the capacitor of the present invention contribute to the simplification of terminal connection structures and connecting steps, and can improve the productivity and reliability. Thus, the present invention is useful.

What is claimed is:
1. A capacitor comprising:
a capacitor element that is a wound element or an element other than the wound element, and that includes electrode bodies each of which is in an anode side and a cathode side, and separators that intervenes between the electrode bodies;
a sealing member that seals an opening of a case member accommodating the capacitor element;
at least one electrode protrusion that protrudes from one of the electrode bodies on an element end-face of the capacitor element, at least one current collector plate that is connected to the at least one electrode protrusion; and at least one terminal member that is disposed in the sealing member, and is superposed on the at least one current collector plate, a side face part of the at least one terminal member being welded to a side face part of the at least one current collector plate, wherein a side face part of the at least one current collector plate is positioned on a side face part of the at least one terminal member, and a welding is carried out by using both of the side face parts of the at least one terminal member and the at least one current collector plate as a common face.

2. The capacitor of claim 1, wherein
the at least one electrode protrusion is an aggregate that is formed by part of one electrode body, which is in the electrode bodies, and is bent toward an element center of the capacitor element to be molded on the element end-face, and is joined to the at least one current collector plate.

3. The capacitor of claim 1, wherein
the at least one electrode protrusion is an anode protrusion that protrudes from the electrode body in the anode side of the capacitor element on the element end-face, or a cathode protrusion that protrudes from the electrode body in the cathode side of the capacitor element on the element end-face, or the capacitor includes two electrode protrusions as the at least one electrode protrusion, which are the anode protrusion and the cathode protrusion, on a same element end-face same as the element end-face, or which are the anode protrusion and a cathode protrusion that protrudes from the electrode body in the cathode side on an element end-face different from the element end-face, where the anode protrusion protrudes.

4. The capacitor of claim 3, wherein
when the anode protrusion and the cathode protrusion are placed on the element end-face of the capacitor element that is common thereto, the anode protrusion and the cathode protrusion are isolated by arrangement of an isolation distance or are insulated by placement of an insulating member.

5. The capacitor of claim 1, wherein
the at least one electrode protrusion is formed over the element end-face of the capacitor element; and
the at least one current collector plate includes
at least one first welded face that is welded to a welded face which is formed on the at least one electrode protrusion, and
a second welded face that is provided for the side face part crossing the first welded face, and is welded to the at least one terminal member.

6. The capacitor of claim 1, wherein
the at least one electrode protrusion includes
a plurality of sections that are formed by each division with a predetermined angle that uses an element center of the element end-face, and by bending toward the element center with a certain bending angle or each different bending angle; and
at least one welded face that is formed on the element end-face by the sections.

7. The capacitor of claim 1, wherein
the at least one current collector plate includes a flat part that protrudes from the side face part welded to the at least one terminal member in a direction of an outer circumference.

8. The capacitor of claim 1, wherein
the at least one terminal member is welded to the at least one current collector plate by laser welding or electron beam welding, and irradiated positions for contact faces of the at least one current collector plate and the at least one terminal member with a laser beam or an electron beam are varied.

9. The capacitor of claim 1, wherein
a cover that is formed on the at least one current collector plate or the at least one terminal member covers contact faces of the at least one current collector plate and the at least one terminal member, and
the at least one current collector plate and the at least one terminal member are welded to each other by irradiation with a laser beam or an electron beam on the cover.

10. The capacitor of claim 1, wherein
the at least one terminal member is welded to the at least one current collector plate by laser welding or electron beam welding, and a nugget depth by the laser welding or the electron beam welding is 1.2 mm or below.

11. The capacitor of claim 1, wherein
the at least one terminal member is welded to the at least one current collector plate by fiber laser beam.

12. A method for manufacturing a capacitor, the method comprising:
making electrode bodies each of which is in an anode side and a cathode side protrude on an element end-face of a capacitor element that includes the electrode bodies and separators intervening between the electrode bodies, and that is a wound element or an element other than the wound element, and forming at least one electrode protrusion on the element end-face;
superposing at least one terminal member that is disposed in a sealing member sealing an opening of a case member accommodating the capacitor element, on at least one current collector plate that is connected to the at least one electrode protrusion; and
positioning a side face part of the at least one current collector plate on a side face part of the at least one terminal member, wherein
a welding is carried out by using both of the side face parts of the at least one terminal member and the at least one current collector plate as a common face.

13. The method of claim 12, further comprising:
superposing the at least one terminal member on the at least one current collector plate, and making the at least one terminal member and the at least one current collector plate be in contact with each other; and
varying irradiated positions for contact faces of the at least one current collector plate and the at least one terminal member with a laser beam or an electron beam, and welding the at least one current collector plate and the at least one terminal member.

14. The method of claim 12, further comprising:
superposing the at least one current collector plate on the at least one electrode protrusion, setting a weld line on the at least one current collector plate in a direction crossing the electrode bodies of the capacitor element, and welding the at least one current collector plate to the at least one electrode protrusion along the weld line.

15. The method of claim 12, further comprising:
placing the at least one current collector plate on the at least one electrode protrusion, setting a weld line that extends from a welding start point to a welding end point on the at least one current collector plate, and connecting the at least one current collector plate to the at least one electrode protrusion by irradiation with a beam, the weld line being sequentially irradiated with the beam, power of the beam being varied sequentially or step by step.

16. The method of claim 12, wherein
the side face part of the at least one terminal member and the side face part of the at least one current collector plate are welded to each other by fiber laser beam.

17. A method for manufacturing a capacitor, the method comprising:
making electrode bodies each of which is in an anode side and a cathode side protrude on an element end-face of a capacitor element that includes the electrode bodies and separators intervening between the electrode bodies, and that is a wound element or an element other than the wound element, and forming at least one electrode protrusion on the element end-face;
superposing at least one terminal member that is disposed in a sealing member sealing an opening of a case member accommodating the capacitor element, on at least one current collector plate that is connected to the at least one electrode protrusion;
providing a cover for the at least one terminal member or the at least one current collector plate, which is connected to the at least one electrode protrusion, and covering contact faces of the at least one terminal member and the at least one current collector plate by the cover; and
setting an irradiating position that is irradiated with a laser beam or an electron beam at the cover, and welding a side face part of the at least one current collector plate and a side face part of the at least one terminal member.

18. A method for manufacturing a capacitor, the method comprising:
making electrode bodies each of which is in an anode side and a cathode side protrude on an element end-face of a capacitor element that includes the electrode bodies and separators intervening between the electrode bodies, and that is a wound element or an element other than the wound element, and forming electrode protrusions on the element end-face;
superposing current collector plates on the electrode protrusions respectively, setting weld lines on the current collector plates in a direction crossing the electrode bodies of the capacitor element, and welding the current collector plates to the electrode protrusions along the weld lines respectively; and
superposing at least one terminal member that is disposed in a sealing member sealing an opening of a case member accommodating the capacitor element, on at least one current collector plate that is connected to one of the electrode protrusions, and welding a side face part of the at least one terminal member and a side face part of the at least one current collector plate, wherein
weld lines that are adjacent to each other are set on the current collector plates that face each other across an isolation distance, the weld lines that are adjacent to each other in a particular place are sequentially welded, the particular place being across an element center of the capacitor element, and after that, weld lines in a place other than the particular place are sequentially welded, and the current collector plates and the electrode protrusions of the capacitor element are welded along the weld lines that are adjacent to each other in each of the particular place and the place other than the particular place respectively.

19. A method for manufacturing a capacitor, the method comprising:
making electrode bodies each of which is in an anode side and a cathode side protrude on an element end-face of a capacitor element that includes the electrode bodies and separators intervening between the electrode bodies, and that is a wound element or an element other than the wound element, and forming at least one electrode protrusion on the element end-face;
forming a first connecting face on at least one current collector plate, which is placed on the element end-face of the capacitor element to be connected to the anode side or the cathode side, the first connecting face being arcuate in a side face direction of the capacitor element;
forming a second connecting face on at least one terminal member that is disposed in a sealing member sealing an opening of a case member accommodating the capacitor element, the second connecting face being concentric with the first connecting face on the at least one current collector plate;
superposing the at least one terminal member on the at least one current collector plate that is connected to the at least one electrode protrusion;
placing the first connecting face and the second connecting face side by side, and using the capacitor element or a welding means that irradiates the first connecting face and the second connecting face with a beam to rotationally move the capacitor element or the welding means; and
welding the first connecting face and the second connecting face, and connecting the at least one current collector plate and the at least one terminal member.

* * * * *